(12) United States Patent
Okita

(10) Patent No.: US 10,254,738 B2
(45) Date of Patent: Apr. 9, 2019

(54) NUMERICAL CONTROLLER AND SIMULATOR THEREOF

(71) Applicant: FANUC CORPORATION, Minamitsuru-gun, Yamanashi (JP)

(72) Inventor: Hiroshi Okita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 153 days.

(21) Appl. No.: 15/416,145

(22) Filed: Jan. 26, 2017

(65) Prior Publication Data
US 2017/0212495 A1    Jul. 27, 2017

(30) Foreign Application Priority Data

Jan. 27, 2016 (JP) ................................. 2016-013861

(51) Int. Cl.
*G05B 19/19* (2006.01)
*G05B 19/4063* (2006.01)
(Continued)

(52) U.S. Cl.
CPC ......... *G05B 19/19* (2013.01); *G05B 19/4063* (2013.01); *G05B 19/4069* (2013.01);
(Continued)

(58) Field of Classification Search
CPC combination set(s) only.
See application file for complete search history.

(56) References Cited

U.S. PATENT DOCUMENTS

| 5,243,534 A | 9/1993 | Yoshikatsu |
| 2004/0083023 A1* | 4/2004 | Suh ................. G05B 19/40931 700/187 |

(Continued)

FOREIGN PATENT DOCUMENTS

| CN | 102346459 A | 2/2012 |
| CN | 102566506 A | 7/2012 |

(Continued)

OTHER PUBLICATIONS

Han et al., Tool Path generation and simulation of dynamic cutting process for five-axis NC machining, Oct. 2010, Chinese Science Bulletin, vol. 55, p. 3408-3418. (Year: 2010).*

(Continued)

*Primary Examiner* — Kidest Bahta
(74) *Attorney, Agent, or Firm* — RatnerPrestia

(57) ABSTRACT

A numerical controller of the present invention is a numerical controller for controlling a machine having two or more paths based on a machining program for a single path in which two or more tools are moved in a radial direction of the workpiece and a direction parallel to the axis of rotation to perform cutting, and includes path assignment means for dividing the machining program into cutting motion groups by using rapid motions as delimiters, assigning the cutting motion groups which are divided to the two or more paths, and generating path assignment information in which the cutting motion groups which are assigned are overlapped between a cutting motion group located earlier on the machining program and a cutting motion group located later such that a cutting position by the cutting motion group located later does not overtake a cutting position by the cutting motion group located earlier.

12 Claims, 23 Drawing Sheets

(51) Int. Cl.
*G05B 19/4069* (2006.01)
*G06F 19/00* (2018.01)

(52) U.S. Cl.
CPC .............. *G05B 2219/36071* (2013.01); *G05B 2219/49111* (2013.01)

(56) References Cited

U.S. PATENT DOCUMENTS

| | | | |
|---|---|---|---|
| 2007/0191982 A1* | 8/2007 | Sullivan | G05B 19/4093 700/182 |
| 2011/0257781 A1 | 10/2011 | Maeda et al. | |
| 2013/0253694 A1* | 9/2013 | Chung | G05B 19/4069 700/186 |
| 2013/0282161 A1* | 10/2013 | Berman | G05B 19/4093 700/187 |
| 2014/0236340 A1 | 8/2014 | Terada et al. | |
| 2016/0082545 A1 | 3/2016 | Kurokawa et al. | |
| 2016/0090695 A1* | 3/2016 | Heap | D21G 9/0009 700/128 |

FOREIGN PATENT DOCUMENTS

| | | |
|---|---|---|
| CN | 103890670 A | 6/2014 |
| JP | S5933509 A | 2/1984 |
| JP | 3-233603 | 10/1991 |
| JP | H 08-118200 A | 5/1996 |
| JP | H08118201 A | 5/1996 |
| JP | 2011-227627 | 11/2011 |
| JP | 4945191 B2 | 6/2012 |
| WO | 2015019668 A1 | 2/2015 |

OTHER PUBLICATIONS

Russ Willcutt, Automating Tool path Optimization, Jun. 1, 2014, ICAM Technologies Corp., no page number, (Year: 2014).*

Decision to Grant a Patent for Japanese Application No. 2016-013861, dated Feb. 6, 2018, including English translation, 6 pages.

Chinese Office Action for Chinese Application No. 201710057454.6, dated Sep. 5, 2018, with translation, 12 pages.

* cited by examiner

FIG.4
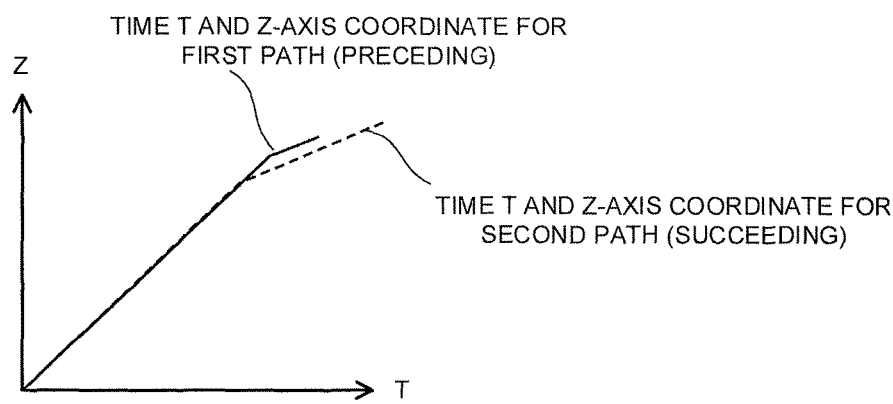
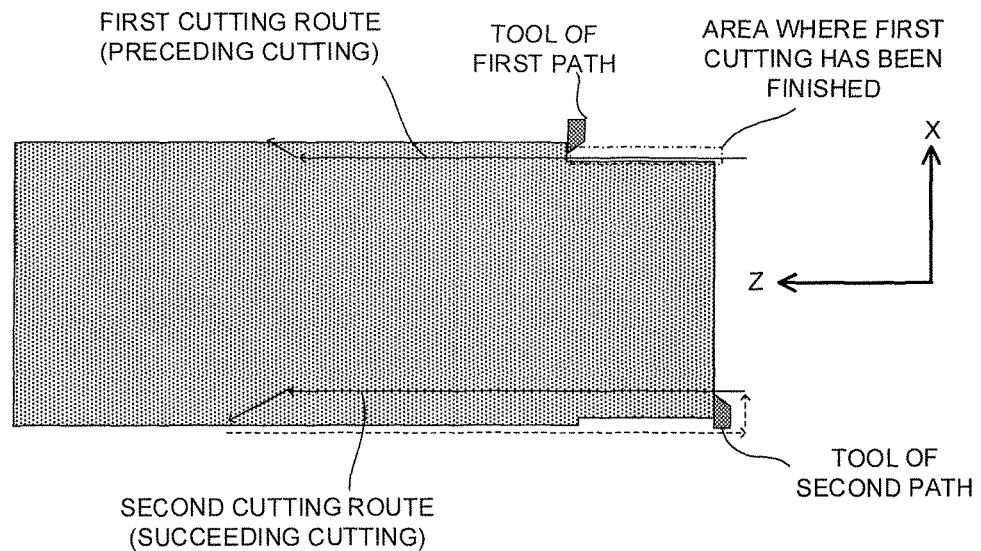

FIG.6
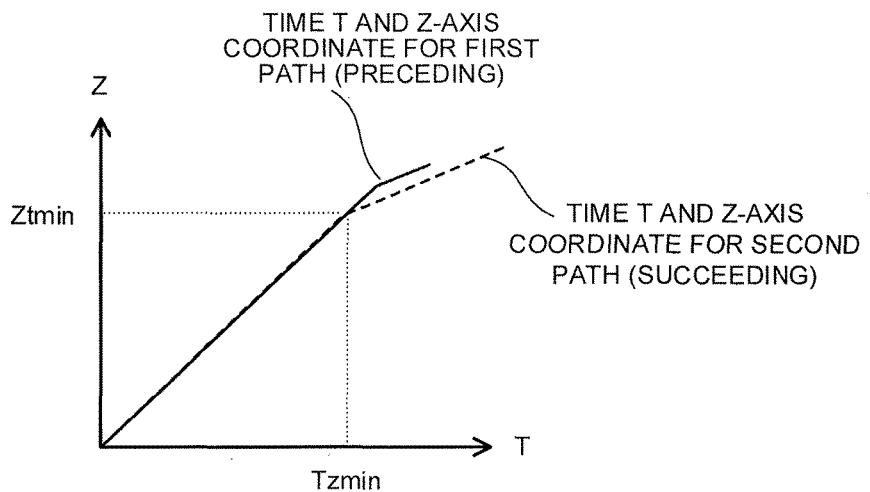
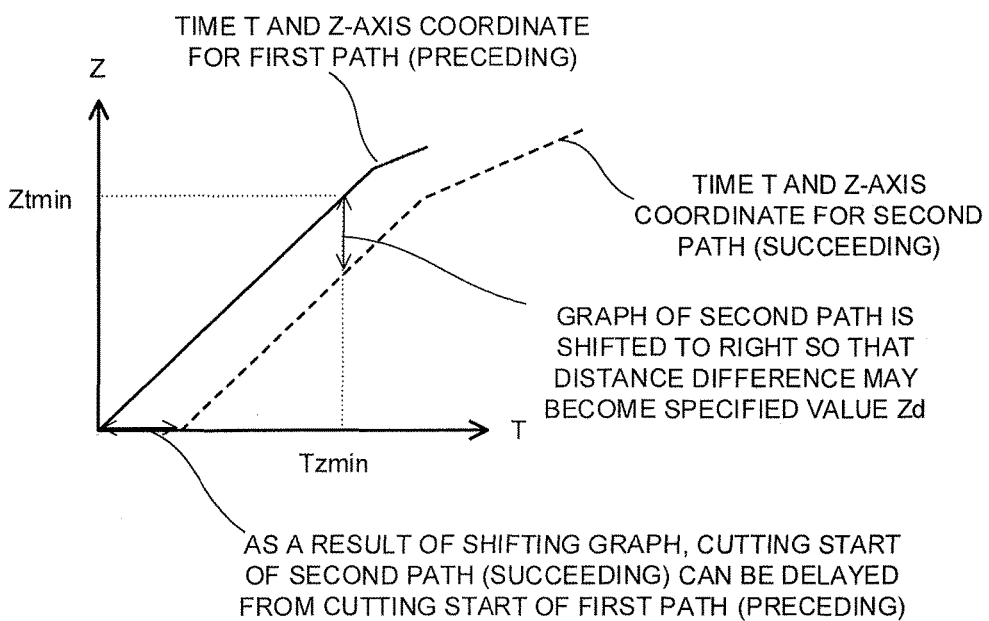

FIG.8
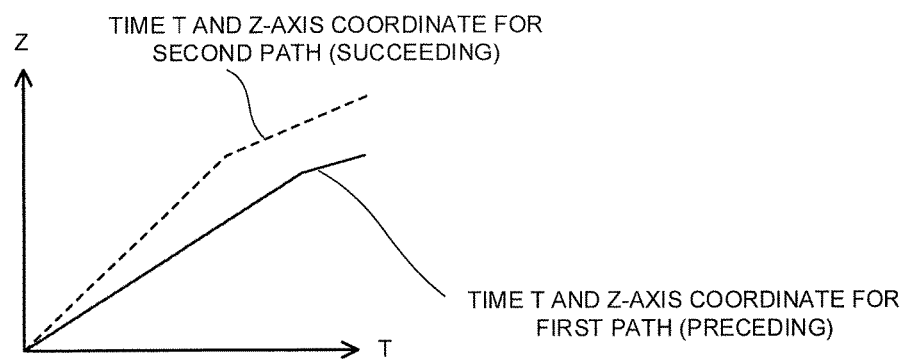
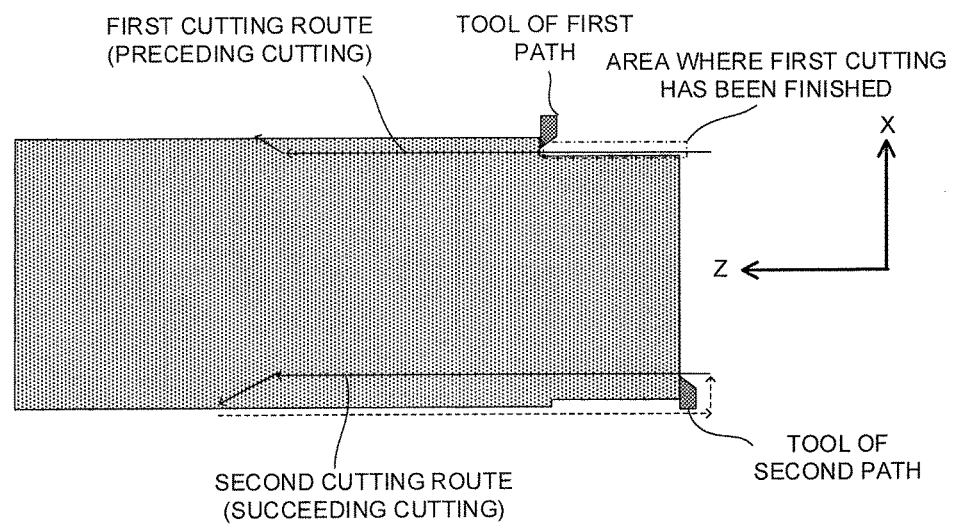

FIG.9
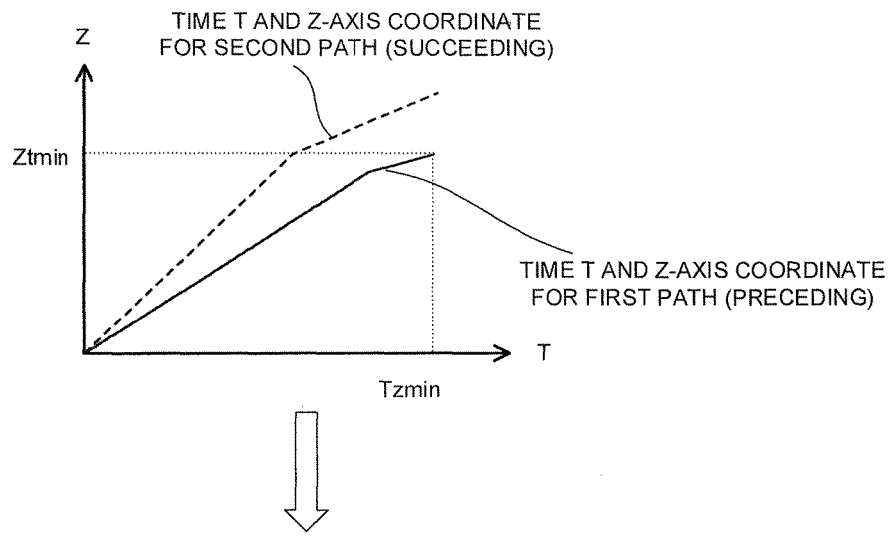
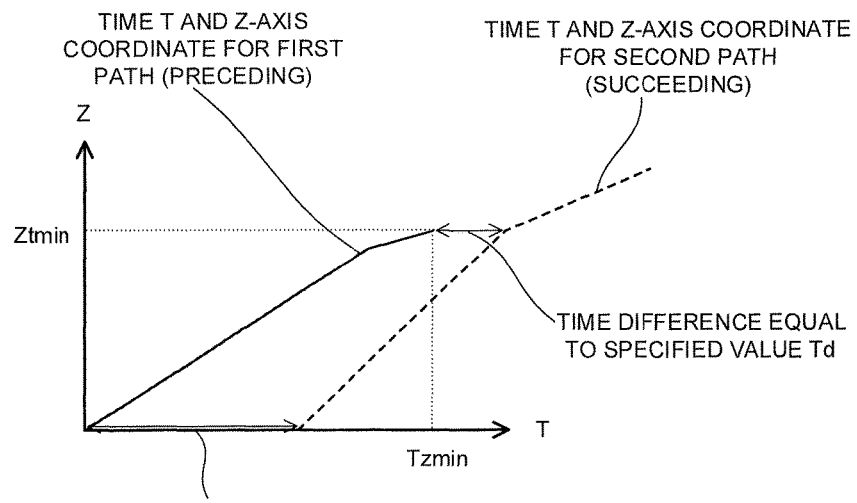
Td VALUE FOR TIME DIFFERENCE CAN BE SET TO SPECIFIED VALUE BY DELAYING CUTTING START OF SECOND PATH (SUCCEEDING) FROM CUTTING START OF FIRST PATH (PRECEDING) BY SPECIFIED VALUE Td + (TIME AT WHICH FIRST PATH (PRECEDING) PASSES Ztmin - TIME AT WHICH SECOND PATH (SUCCEEDING) PASSES Ztmin)

FIG.10
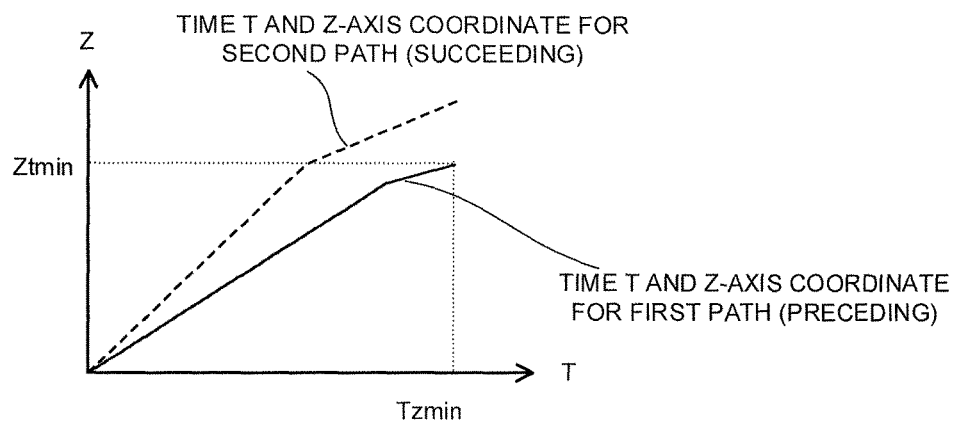
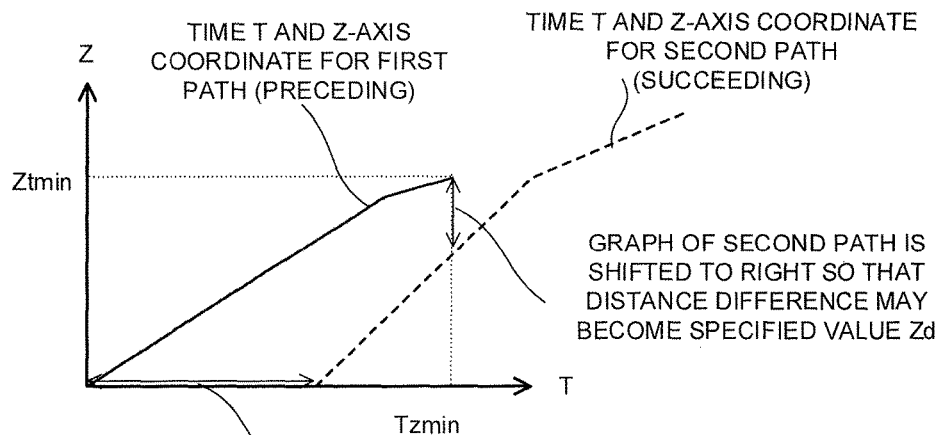

FIG.12
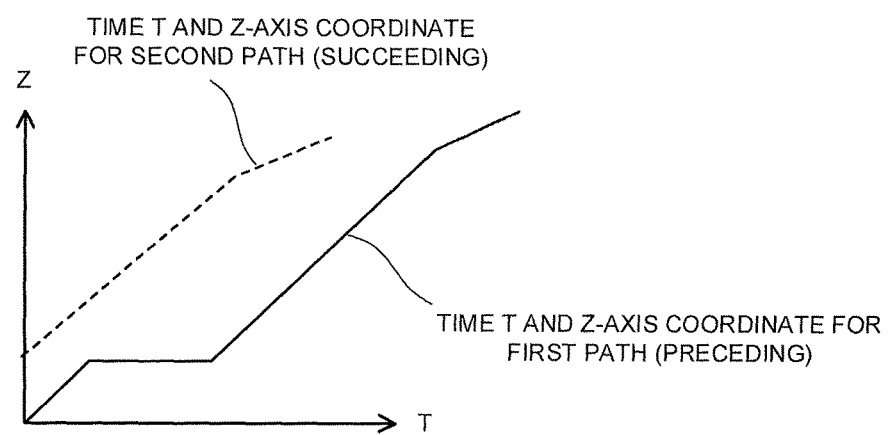
TIME T AND Z-AXIS COORDINATE FOR SECOND PATH (SUCCEEDING)
TIME T AND Z-AXIS COORDINATE FOR FIRST PATH (PRECEDING)
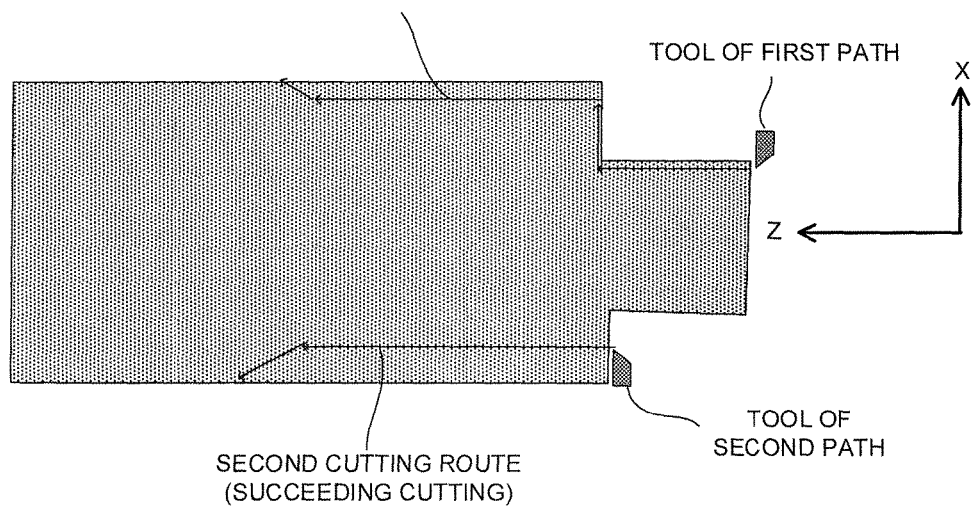
FIRST CUTTING ROUTE (PRECEDING CUTTING)
TOOL OF FIRST PATH
TOOL OF SECOND PATH
SECOND CUTTING ROUTE (SUCCEEDING CUTTING)

FIG.14
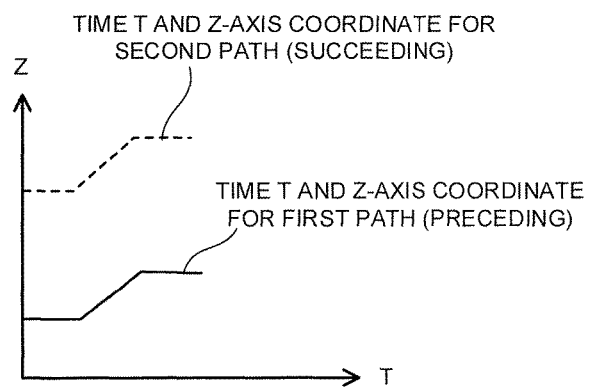
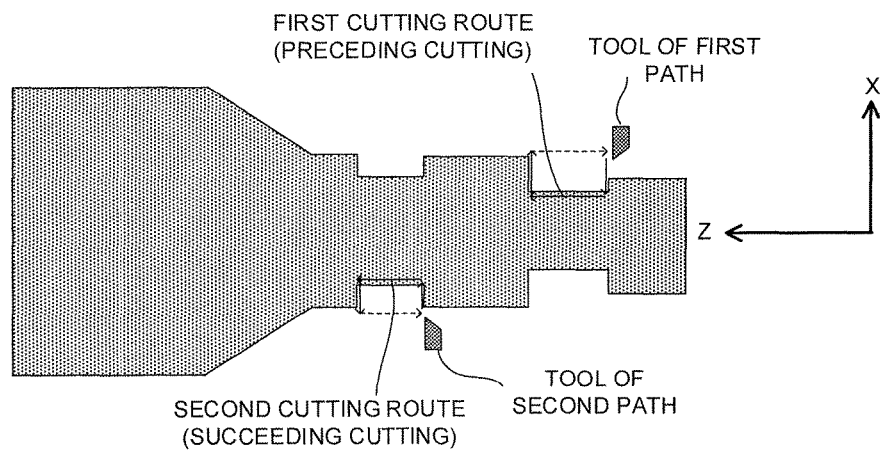

FIG.16
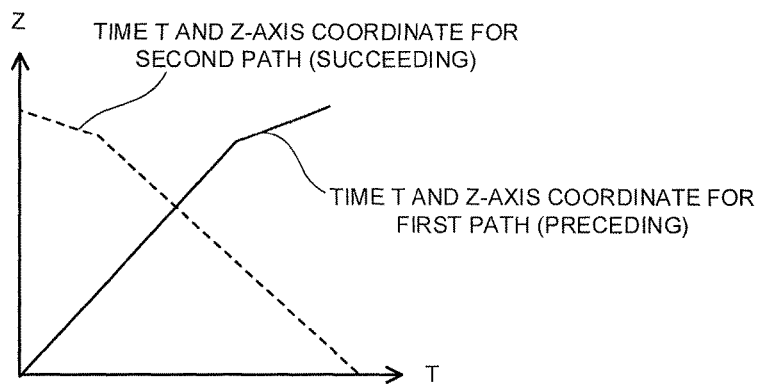
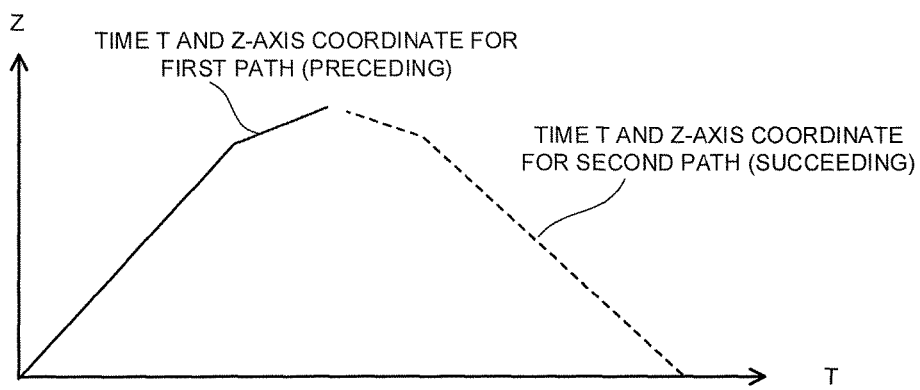
SECOND PATH (SUCCEEDING) IS STARTED AFTER CUTTING
MOTIONS OF FIRST PATH (PRECEDING) ARE FINISHED FIG.17
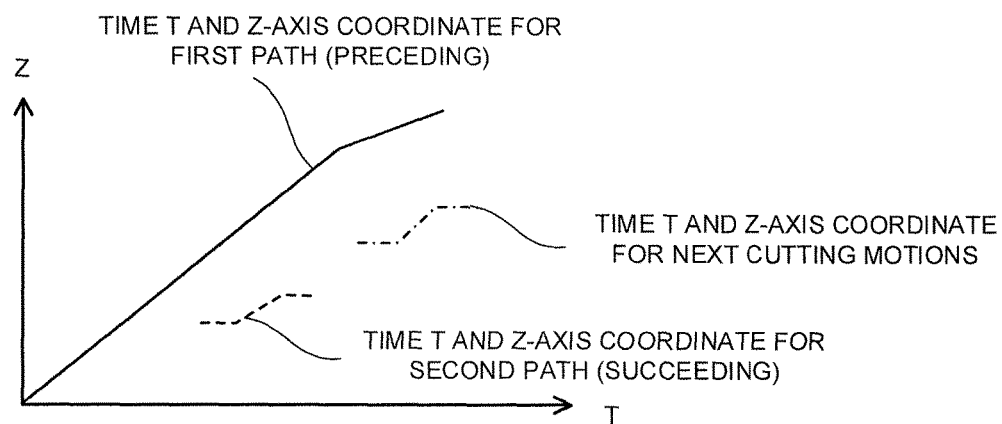
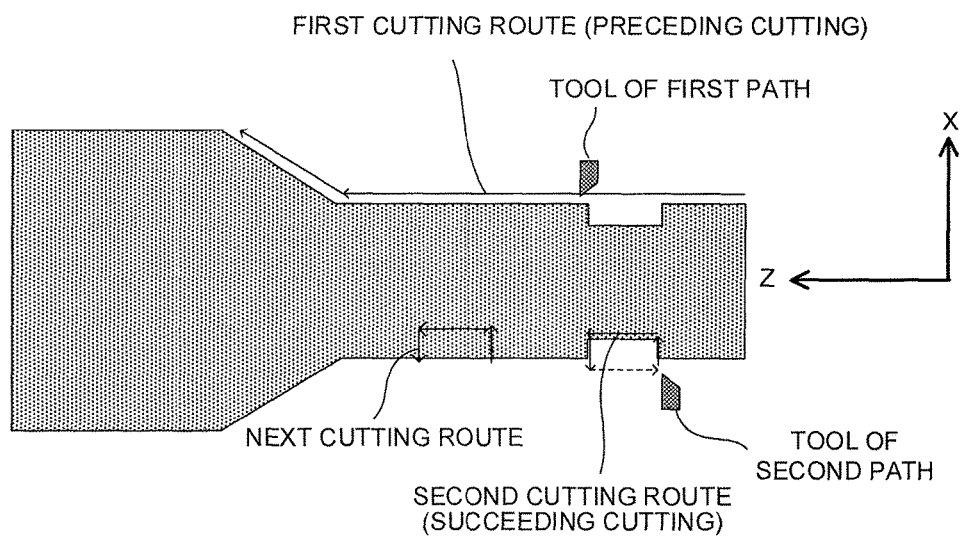

DISPLAY MOVEMENT OF TOOLS OF RESPECTIVE PATHS
BASED ON MACHINING SIMULATION

FIG.23
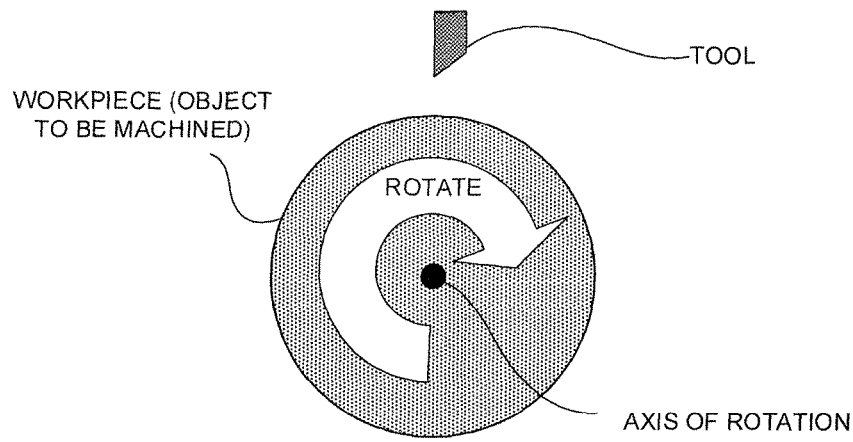
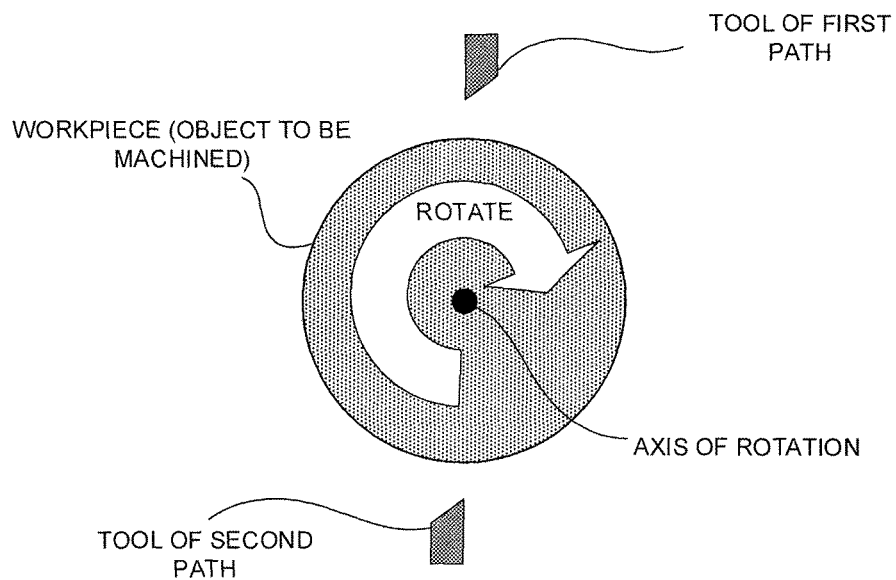

NUMERICAL CONTROLLER AND SIMULATOR THEREOF

BACKGROUND OF THE INVENTION

1. Field of the Invention

The present invention relates to a numerical controller and a simulator and, more particularly, to a numerical controller which controls axes of two or more paths using a program for a single path, and a simulator thereof.

2. Description of the Related Art

FIG. 23 is a view showing lathe working. In lathe working, a workpiece (object to be machined) attached to a main axis is rotated, and a tool is moved in a radial direction of the workpiece and in a direction parallel to the axis of rotation to perform cutting. The tool is fixed to a support called a tool rest. A machine having a single tool rest is called a single-path (or mono-path) machine, and a machine having two or more tool rests is called a multi-path (or two-or-more-path) machine. In lathe working which does not require main axis positioning, applying the tool to the workpiece toward the axis of rotation of the workpiece from any direction provides the same machining. Controlling two or more paths and simultaneously performing machining realize high-speed machining.

Machining which is performed by controlling two or more paths as described above requires creating two or more machining programs for controlling the respective paths. Creating machining programs for issuing commands to the two or more paths takes a lot of effort. Accordingly, prior art techniques have been proposed which support the creation of machining programs for issuing commands to two or more paths such as described above.

For example, Japanese Patent Application Laid-Open No. 8-118200 discloses the following technique: a machining program for controlling two or more paths is created using indirect commands which do not specify a main axis or a tool rest, and indirect commands of the machining program for each path are converted to direct commands for a specific main axis or a specific tool rest and used when machining is performed.

Moreover, Japanese Patent Application Laid-Open No. 2011-227627 discloses the following technique: for machining steps inputted by an operator, inputs concerning paths capable of executing each machining step, orders in which machining steps can be executed, and combinations of machining steps which can be executed at the same time are accepted; and a machining program is created which satisfies the inputted conditions and which minimizes machining time.

Further, Japanese Patent Application Laid-Open No. 3-233603 discloses the following technique: in an automatic programming unit of a numerical control machine tool having two or more main axes, one program created in one coordinate series includes a machining process by two main axes and a transfer process which is automatically created based on the difference between a set workpiece reference origin position and a workpiece origin position and in which the workpiece is transferred between the two main axes, and this single program is outputted to a numerical controller for controlling the numerical control machine tool having two or more main axes.

In the case where the above-described prior art technique is used to generate a machining program for two or more paths, if interference or the like may occur between machining steps, a machining program is created such that such machining steps are not executed at the same time as machining steps which cannot be executed at the same time. However, even if a machining program for two or more paths is generated by such a method, there is a problem that the machining speed of lathe working cannot be efficiently increased.

FIG. 24 shows the movement of a tool for the case where lathe working is performed with a single path. Moreover, FIG. 25 schematically shows the order of movement of the tool in FIG. 24. In FIGS. 24 and 25, solid arrows indicate routes of cutting motions of the tool, and dotted arrows indicate routes of rapid motions of the tool. Thus, in single-path lathe working, machining is performed by sequentially executing several cutting motions based on several commands created based on the shape of a workpiece after machining. In the case where such machining is performed with two or more paths, several cutting motion commands are assigned to the paths. For example, a first machining step and a second machining step shown in FIG. 25 perform machining at positions on the workpiece which have overlapping Z-axis coordinates. Accordingly, in the case where these machining steps are assigned to different paths and where an attempt to perform the machining steps at the same time is made, when machining by the second machining step is performed at a position on the workpiece where machining by the first machining step has not been performed yet, machining of an appropriate cut depth cannot be performed, and there occur the following problems: the tool or a servo motor for driving the tool is heavily loaded, the quality of a machined surface is deteriorated, or the like. Accordingly, in the case where a machining program for controlling two or more paths is generated using a prior art technique, the first machining step and the second machining step shown in FIG. 25 are assigned to the same path, or, even when the first machining step and the second machining step shown in FIG. 25 are assigned to different paths, the second machining step is on standby not to be started until the first machining step is finished. Thus, a machining program is generated such that the first machining step and the second machining step are not performed at the same time. Similarly, almost all of the machining steps shown in FIG. 25 perform machining at positions in which Z-axis coordinates overlap each other, and a machining program is generated such that almost all of the machining steps are not performed at the same time. Accordingly, the speed of machining cannot be efficiently increased using two or more paths.

SUMMARY OF THE INVENTION

In view of this, an object of the present invention is to provide a numerical controller which controls two or more paths using a program for a single path and which can efficiently increase the speed of machining, and a simulator thereof.

A numerical controller according to the present invention controls a machine having two or more paths based on a machining program for a single path in which a workpiece is attached to a main axis to be rotated and in which two or more tools are moved in a radial direction of the workpiece and a direction parallel to the axis of rotation to perform cutting. The numerical controller includes path assignment means for dividing the machining program into cutting motion groups by using rapid motions as delimiters, assigning the cutting motion groups which are divided to the two or more paths, and generating path assignment information in which the cutting motion groups which are assigned are overlapped between a cutting motion group located earlier on the machining program and a cutting motion group located later such that a cutting position by the cutting motion group located later does not overtake a cutting position by the cutting motion group located earlier. The numerical controller controls the two or more paths of the machine based on the path assignment information generated by the path assignment means.

In the numerical controller according to one aspect of the present invention, the path assignment means overlaps the cutting motion groups such that the cutting position by the cutting motion group located later does not overtake the cutting position by the cutting motion group located earlier by setting cutting start timing of the cutting motion group located later.

In the numerical controller according to one aspect of the present invention, the path assignment means sets the cutting start timing of the cutting motion group located later based on a preset value for a minimum time difference between cutting by the cutting motion group located earlier and cutting by the cutting motion group located later.

In the numerical controller according to one aspect of the present invention, the path assignment means sets the cutting start timing of the cutting motion group located later based on a preset value for a minimum distance difference between cutting by the cutting motion group located earlier and cutting by the cutting motion group located later.

In the numerical controller according to one aspect of the present invention, if it is determined that coordinates of the cutting position by the cutting motion group located earlier and the cutting position by the cutting motion group located later do not overlap each other with respect to a direction of an axis of rotation of the main axis, the path assignment means sets the path assignment information such that cutting by the cutting motion group located later is started regardless of the cutting position by the cutting motion group located earlier.

In the numerical controller according to one aspect of the present invention, if cutting by the cutting motion group located later is finished earlier than cutting by the cutting motion group located earlier, the path assignment means assigns a next cutting motion group to the path finishing cutting earlier.

A simulator according to the present invention simulates operation of a machine having two or more paths based on a machining program for a single path in which a workpiece is attached to a main axis to be rotated and in which two or more tools are moved in a radial direction of the workpiece and a direction parallel to the axis of rotation to perform cutting. The simulator includes path assignment means for dividing the machining program into cutting motion groups by using rapid motions as delimiters, assigning the cutting motion groups which are divided to the two or more paths, and generating path assignment information in which the cutting motion groups which are assigned are overlapped between a cutting motion group located earlier on the machining program and a cutting motion group located later such that a cutting position by the cutting motion group located later does not overtake a cutting position by the cutting motion group located earlier. The simulator simulates operation of the two or more paths of the machine based on the path assignment information generated by the path assignment means.

In the simulator according to one aspect of the present invention, the path assignment means overlaps the cutting motion groups such that the cutting position by the cutting motion group located later does not overtake the cutting position by the cutting motion group located earlier by setting cutting start timing of the cutting motion group located later.

In the simulator according to one aspect of the present invention, the path assignment means sets the cutting start timing of the cutting motion group located later based on a preset value for a minimum time difference between cutting by the cutting motion group located earlier and cutting by the cutting motion group located later.

In the simulator according to one aspect of the present invention, the path assignment means sets the cutting start timing of the cutting motion group located later based on a preset value for a minimum distance difference between cutting by the cutting motion group located earlier and cutting by the cutting motion group located later.

In the simulator according to one aspect of the present invention, if it is determined that coordinates of the cutting position by the cutting motion group located earlier and the cutting position by the cutting motion group located later do not overlap each other with respect to a direction of an axis of rotation of the main axis, the path assignment means sets the path assignment information such that cutting by the cutting motion group located later is started regardless of the cutting position by the cutting motion group located earlier.

In the simulator according to one aspect of the present invention, if cutting by the cutting motion group located later is finished earlier than cutting by the cutting motion group located earlier, the path assignment means assigns a next cutting motion group to the path finishing cutting earlier.

In the present invention, cutting motion commands contained in a program for a single path created by an operator are automatically assigned to two or more paths, and the two or more paths are respectively controlled based on the assigned cutting motion commands. Accordingly, the operator increases the speed of machining using two or more paths without having to create a cutting program for two or more paths.

BRIEF DESCRIPTION OF THE DRAWINGS

These and other objects and features of the present invention will become apparent from the following description of exemplary embodiments with reference to the accompanying drawings in which:

FIG. 4 is a view showing the relationship between time T and Z-axis coordinate for preceding cutting and succeeding cutting with a graph;

FIG. 6 is a view for explaining a method for shifting the start timing of the succeeding cutting with respect to the preceding cutting based on a distance difference;

FIG. 8 is a view showing the relationship between time T and Z-axis coordinate for preceding cutting and succeeding cutting having different feed rates with a graph;

FIG. 9 is a view for explaining a method for shifting the start timing of the succeeding cutting with respect to preceding cutting having a different feed rate based on a time difference;

FIG. 10 is a view for explaining a method for shifting the start timing of the succeeding cutting with respect to preceding cutting having a different feed rate based on a distance difference;

FIG. 12 is a view showing the relationship between time T and Z-axis coordinate for preceding cutting and succeeding cutting having different cutting start Z coordinates with a graph;

FIG. 14 is a view showing the relationship between time T and Z-axis coordinate for preceding cutting and succeeding cutting in which Z coordinates do not overlap each other with a graph;

FIG. 16 is a view for explaining a method for shifting the start timing of the succeeding cutting with respect to preceding cutting having a different cutting direction;

FIG. 17 is a view for explaining an assignment method for the case where succeeding cutting is finished, earlier than preceding cutting;

FIG. 23 is a view showing examples of single-path lathe working and multi-path lathe working;

DETAILED DESCRIPTION OF THE PREFERRED EMBODIMENTS

Hereinafter, embodiments of the present invention will be described with reference to drawings. First, the basic principle of operation of the present invention will be described.

Figure 1:
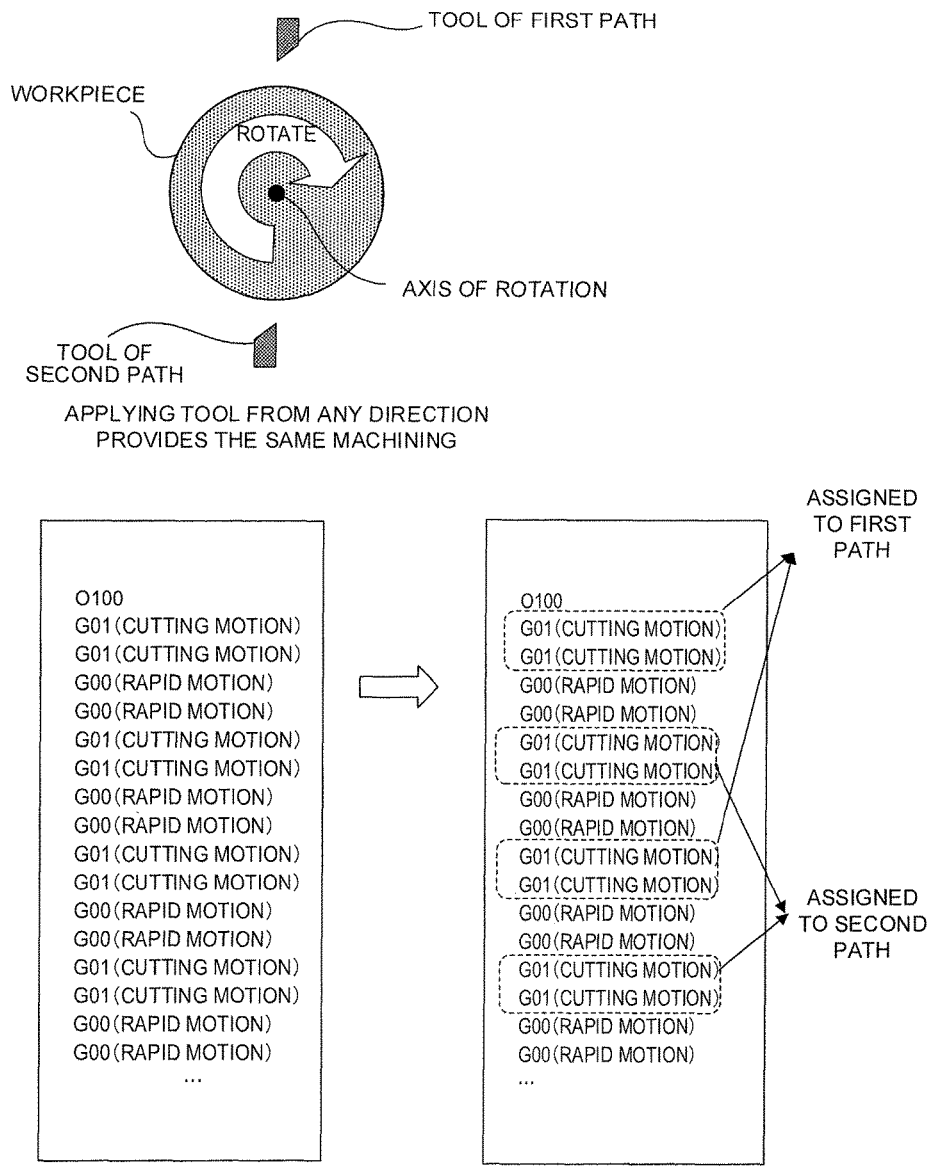
FIG. 1 is a view showing an example in which a machining program for a single path is divided into portions assigned to two or more paths in a numerical controller of the present invention.

A numerical controller of the present invention automatically assigns cutting motion commands of a program for a single path to two or more paths and controls the paths based on the assigned commands to perform cutting. As shown in FIG. 1, a cutting program, which mainly includes cutting motions and rapid motions, is separated by rapid motions to create a plurality of sets of cutting motions. Each of the plurality of sets of cutting motions is assigned to one of the paths. The paths are controlled at the same time. Thus, a plurality of cutting motions are executed in an overlapped manner to increase the speed of cutting.

Figure 2:
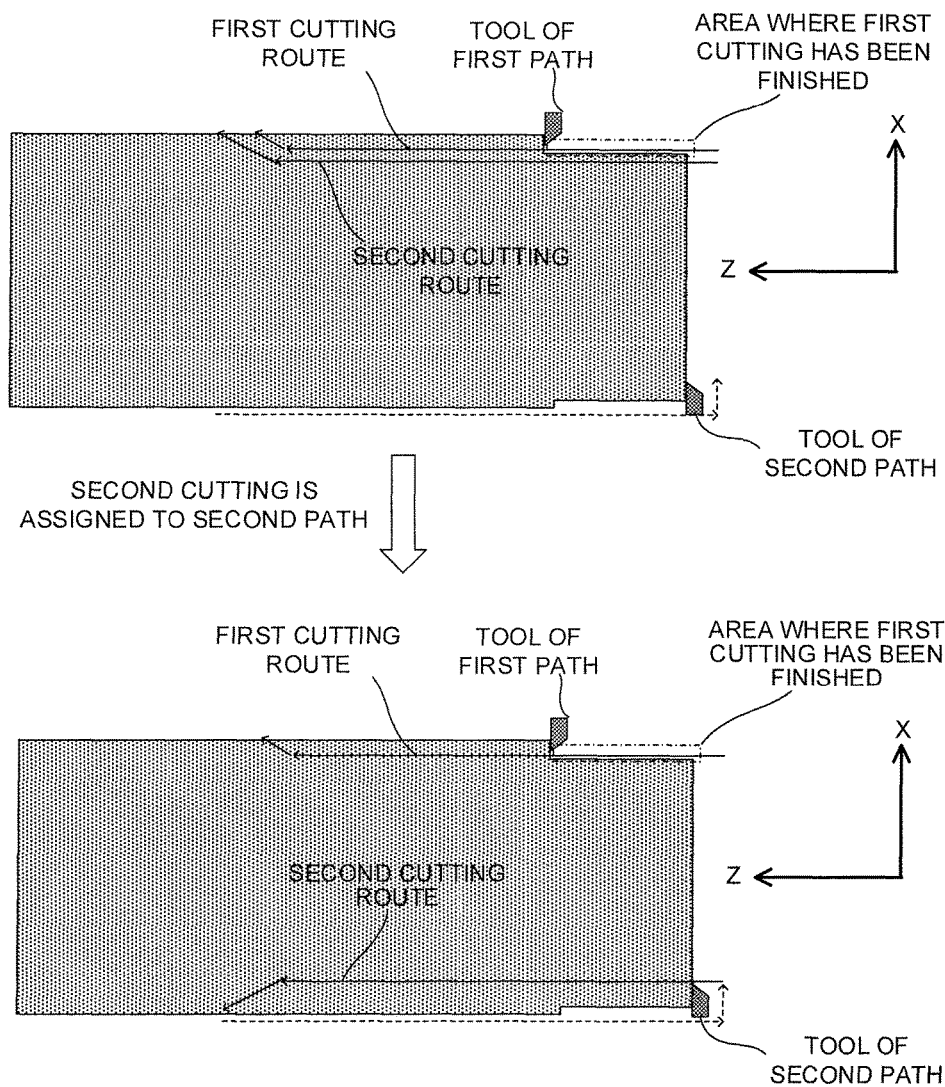
FIG. 2 is a view showing an example in which two cutting motions are assigned to two paths in the numerical controller of the present invention.

In the case where control is performed such that two cutting motions of a machining program are allotted to a first path (preceding cutting) and a second path (succeeding cutting) as shown in FIG. 2, tool routes of the respective paths are such as shown in FIG. 2. The succeeding machining can be started such that the succeeding machining overlaps the preceding machining before the preceding cutting is finished unless the order of the preceding cutting and the succeeding cutting is reversed.

Two cutting motions are assumed to be performed in order as shown in FIG. 2. A first cutting motion is assumed to be assigned to a tool of the first path, and a second cutting motion is assigned to a tool of the second path. If the tool of the second path overtakes the tool of the first path on the Z coordinate (that is, the order is reversed), a cut depth to which the tool of the second path cuts into a workpiece increases. This may cause tool breakage or machined-surface quality deterioration. Meanwhile, if the feed rate of the tool of each path is changed in the middle of the machining in order to prevent the above-described problems, problems such as a change in machined-surface quality or the like also occur. Accordingly, it is preferable that the feed rate is kept at a value specified by the machining program without change. For this reason, in the control of the tool of the second path, a portion which has already been cut by the tool of the first path is determined to be capable of being cut, and control needs to be performed such that control specified by a cutting command assigned to the second path is started. In that control, the feed rate of the tool is specified by the machining program, machining conditions, or the like. Accordingly, cutting start timing is controlled so that the cutting may not overtake the previous cutting when the tool is moved at the feed rate.

Figure 3:
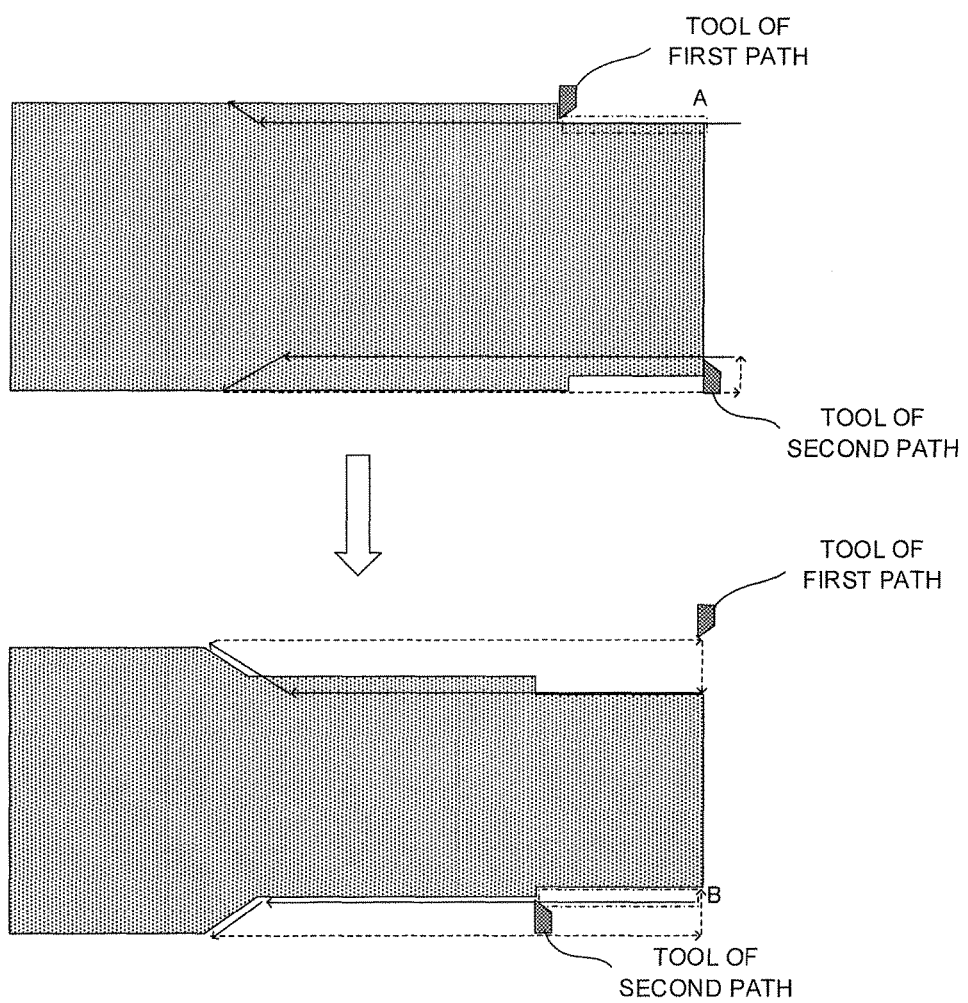
FIG. 3 is a view showing an example in which the next cutting motion is assigned to one of the paths after FIG. 2.

Moreover, when first cutting by the tool of the first path is finished as shown in FIG. 3, then the cutting motion command executed by the second path is skipped, and the tool of the first path is controlled based on a third cutting command. At this time, the tool track of the second path is checked, a portion which has already been cut by the tool of the second path is determined to be capable of being cut, and control specified by the next cutting command is started.

In this way, the overlapping of cutting motions of the respective paths can reduce machining time by the overlap.

The numerical controller of the present invention simulates motions of the Z coordinates of the tools of the respective paths based on the respective cutting commands in a simplified manner, and adjusts the cutting start timing of the tool of the path performing the succeeding cutting so that the tool of the path performing the succeeding cutting may not overtake the position of the tool of the path performing the preceding cutting.

FIG. 4 is a view showing the relationship between time T and Z-axis coordinate for cutting motions of the first path (preceding cutting) and the second path (succeeding cutting) with a graph. As shown in FIG. 4, the Z coordinate at a time of 0 is the start position of each cutting motion. In a portion of this graph in which the first path (preceding cutting) and the second path (succeeding cutting) overlap each other, simultaneously starting the cutting motions causes the first path and the second path to machine the same position at the same time. To maintain the order of machining, the time T of the second path (succeeding cutting) should necessarily be later (to the right in the graph) for the same Z coordinate in the graph. In other words, "the time at which the first path (preceding cutting) passes a certain Z<the time at which the second path (succeeding cutting) passes the same Z" needs to be satisfied.

Figure 5:
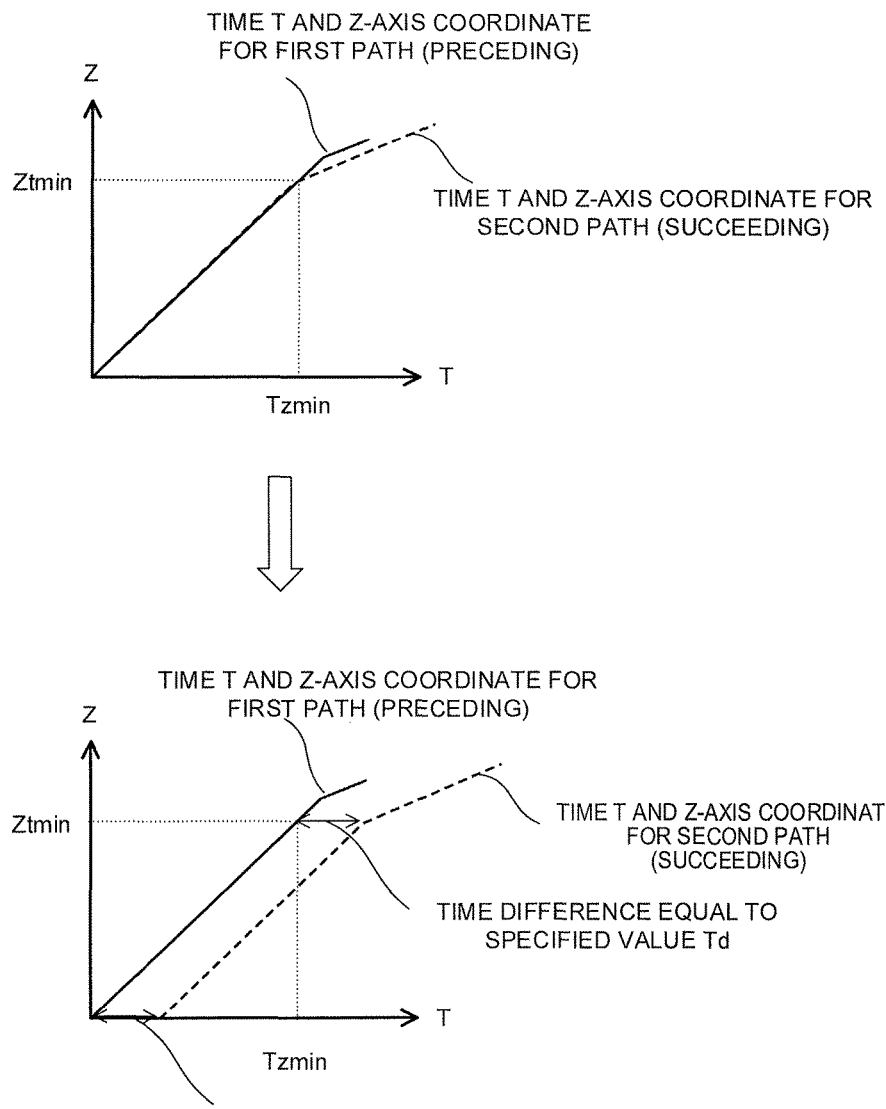
FIG. 5 is a view for explaining a method for shifting the start timing of the succeeding cutting with respect to the preceding cutting based on a time difference.

FIG. 5 is a view for explaining a method for shifting the start timing of the cutting motion of the second path (succeeding cutting) with respect to the cutting motion of the first path (preceding cutting) based on a time difference. The numerical controller of the present invention finds a point ((Ztmin, Tzmin) on the graph shown in FIG. 5) at which the time at which the cutting motion of the second path (succeeding cutting) passes a Z coordinate–the time at which the cutting motion of the first path (preceding cutting) passes the same Z coordinate is minimum, in the range of Z coordinates over which the cutting motion of the first path (preceding cutting) is moved, on the assumption that the first path (preceding cutting) and the second path (succeeding cutting) are started at the same time. This point is a point at which the second path (succeeding cutting) comes closest to the cutting of the first path (preceding cutting) while the delay of the start of the second path (succeeding cutting) is being increased. It should be noted that if two or more points satisfy the above-described conditions, an appropriate point (for example, the latest point on the time axis) may be selected among the points as (Ztmin, Tzmin). This point is used as a reference to determine the start timing of the second path (succeeding cutting). Specifically, the graph of the second path (succeeding cutting) is moved to the right so that the difference between the time of the first path (preceding cutting) and the time of the second path (succeeding cutting) at the Z coordinate value Ztmin of this point may become a preset value Td for a minimum time difference. More specifically, the cutting start of the second path (succeeding cutting) is delayed from the cutting start of the first path (preceding cutting) by an amount of time corresponding to the specified value Td+(the time at which the first path (preceding cutting) passes Ztmin–the time at which the second path (succeeding cutting) passes Ztmin).

FIG. 6 is a view for explaining a method for shifting the start timing of the cutting motion of the second path (succeeding cutting) with respect to the cutting motion of the first path (preceding cutting) based on a distance difference. In the case where the delay of cutting of the second path (succeeding cutting) is set based on a distance difference along the Z axis, the graph of the second path (succeeding cutting) is moved to the right so that the difference between the Z coordinate of the first path (preceding cutting) and the Z coordinate of the second path (succeeding cutting) at time Tzmin may become a specified value Zd for a minimum Z-coordinate distance difference. More specifically, the time at which the Z coordinate of the second path (succeeding cutting) becomes Ztmin–the specified value Zd for the minimum distance difference is found, and the graph of the second path (succeeding cutting) is moved to the right by an amount of time obtained by subtracting the found time from Tzmin. Thus, the value of the distance difference can be made equal to the specified value Zd by delaying the cutting start of the second path (succeeding cutting) from the cutting start of the first path (preceding cutting) by the obtained amount of time.

Figure 7:
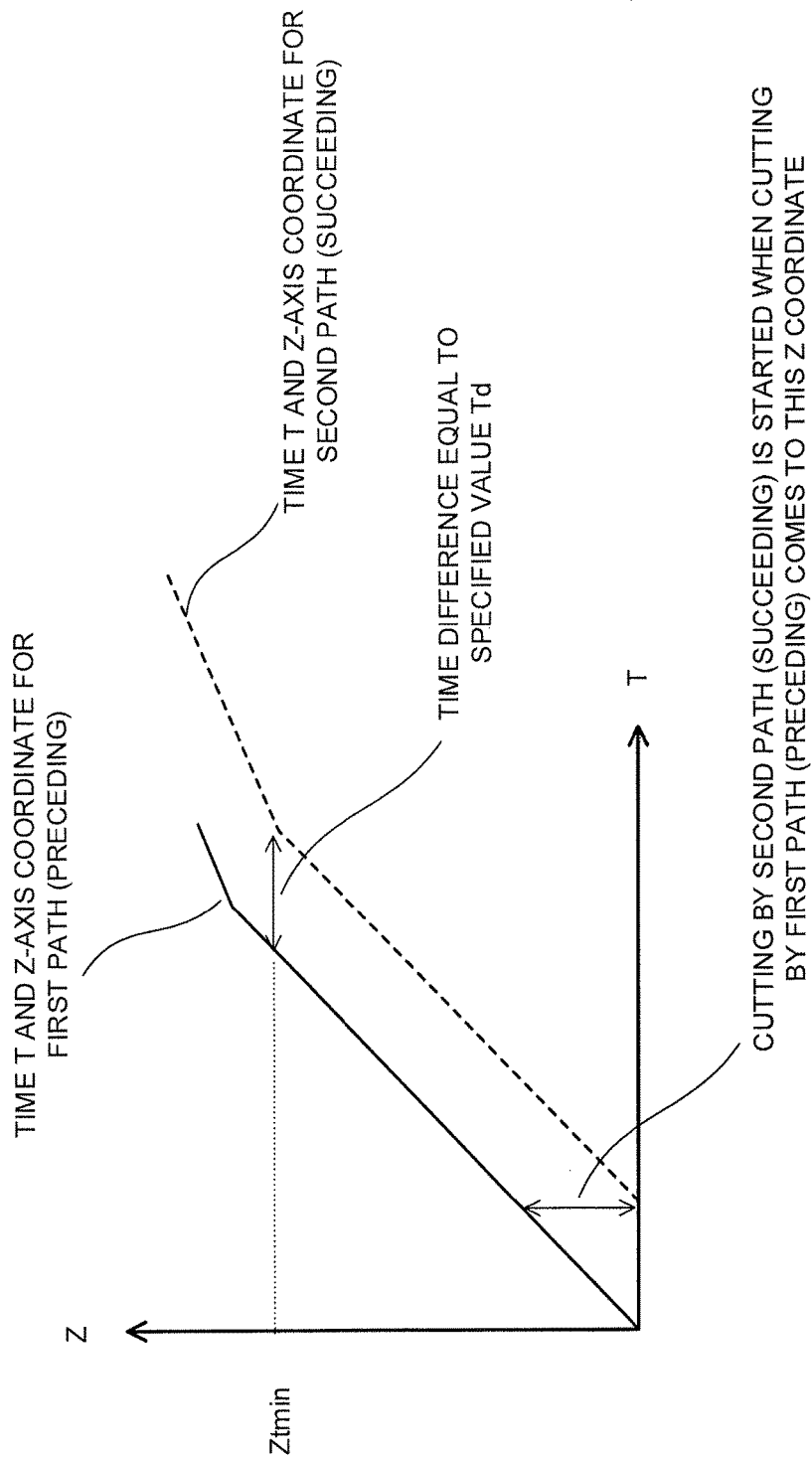
FIG. 7 is a view for explaining another method for shifting the start timing of the succeeding cutting with respect to the preceding cutting.

Instead, it is possible to find the Z coordinate of the first path (preceding cutting) at the start time of the second path (succeeding cutting) as shown in FIG. 7 and start the second path (succeeding cutting) when the first path (preceding cutting) comes to that position.

The above description assumes that the feed rates of the first path (preceding cutting) and the second path (succeeding cutting) are equal. In the case where the first path (preceding cutting) and the second path (succeeding cutting) have different feed rates, the start timing of the second path (succeeding cutting) can be determined in a similar way.

For example, a case where the first path (preceding cutting) and the second path (succeeding cutting) have different feed rates as shown in FIG. 8 will be described.

FIG. 9 is a view for explaining a method for shifting the start timing of the cutting motion of the second path (succeeding cutting) with respect to the cutting motion of the first path (preceding cutting) based on a time difference in the case where the first path (preceding cutting) and the second path (succeeding cutting) have different feed rates. In the case where the first path (preceding cutting) and the second path (succeeding cutting) have different feed rates, the start timing of the second path (succeeding cutting) is determined as in the case of FIG. 5. Specifically, a point ((Ztmin, Tzmin) on the graph shown in FIG. 9) at which the time at which the cutting motion of the second path (succeeding cutting) passes a Z coordinate–the time at which the cutting motion of the first path (preceding cutting) passes the same Z coordinate is minimum is found in the range of Z coordinates over which the cutting motion of the first path (preceding cutting) is moved, on the assumption that the first path (preceding cutting) and the second path (succeeding cutting) are started at the same time, and the start timing of the second path (succeeding cutting) is determined with reference to the point.

FIG. 10 is a view for explaining a method for shifting the start timing of the cutting motion of the second path (succeeding cutting) with respect to the cutting motion of the first path (preceding cutting) based on a distance difference in the case where the first path (preceding cutting) and the second path (succeeding cutting) have different feed rates. In this case, to set the delay of cutting of the second path (succeeding cutting) based on a distance difference along the Z axis as in the case of FIG. 6, the graph of the second path (succeeding cutting) is moved to the right so that the difference between the Z coordinate of the first path (preceding cutting) and the Z coordinate of the second path (succeeding cutting) at time Tzmin may become the preset value Zd for the minimum Z-coordinate distance difference. More specifically, the time at which the Z coordinate of the second path (succeeding cutting) becomes Ztmin–the specified value Zd for the minimum distance difference is found, and the graph of the second path (succeeding cutting) is moved to the right by an amount of time obtained by subtracting the found time from Tzmin.

Figure 11:
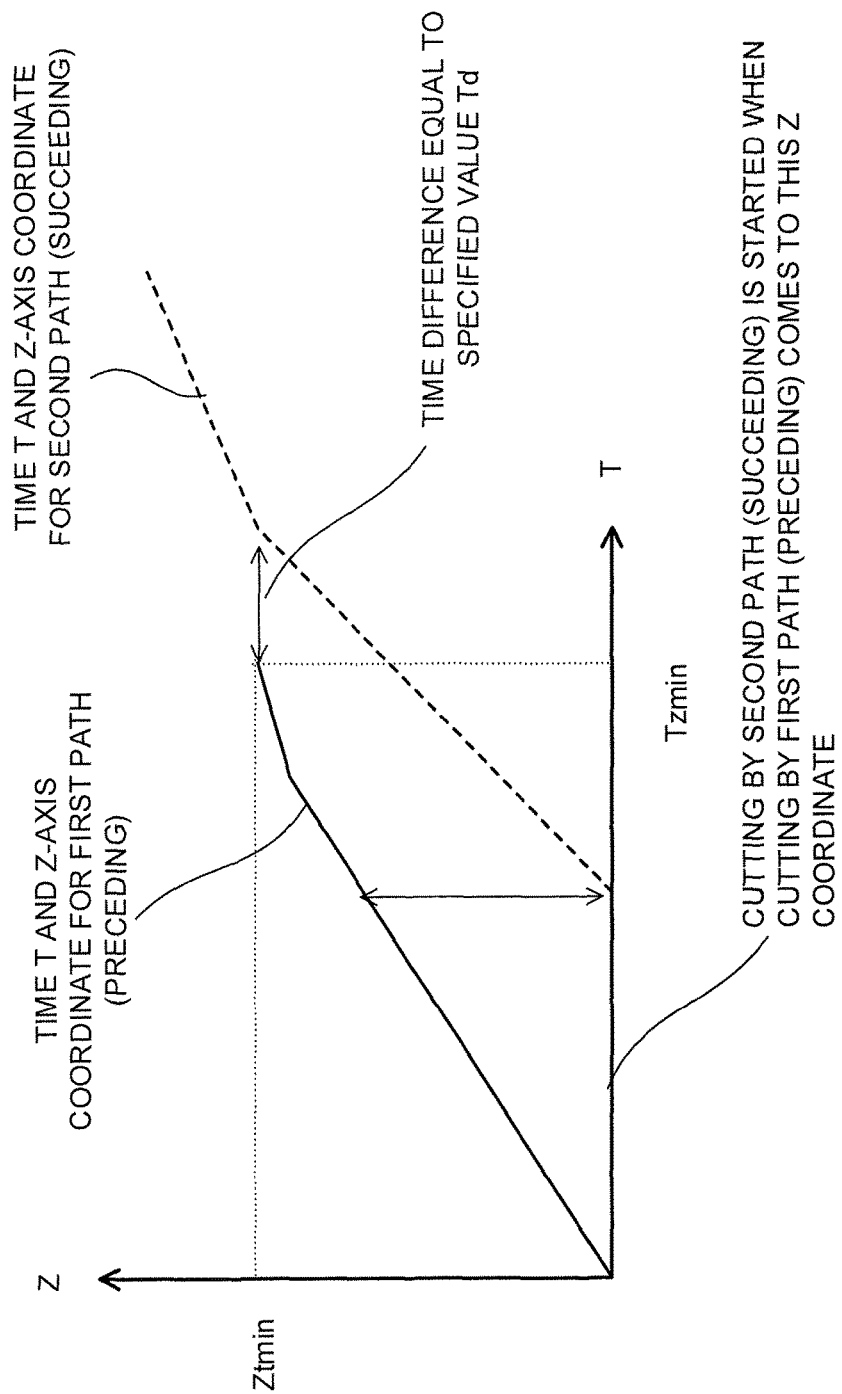
FIG. 11 is a view for explaining another method for shifting the start timing of the succeeding cutting with respect to preceding cutting having a different feed rate.

Instead, it is possible to find the Z coordinate of the first path (preceding cutting) at the start time of the second path (succeeding cutting) as shown in FIG. 11 and start the second path (succeeding cutting) when the first path (preceding cutting) comes to that position.

Figure 13:
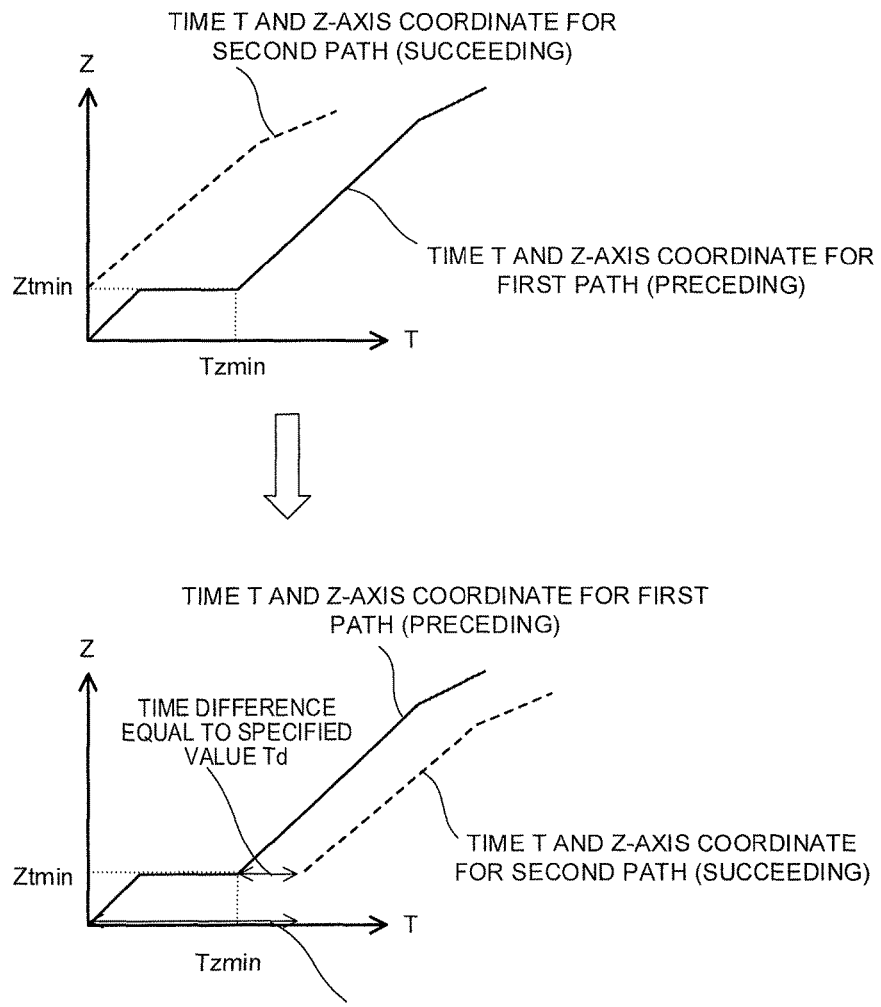
FIG. 13 is a view for explaining a method for shifting the start timing of the succeeding cutting with respect, to preceding cutting having a different cutting start Z coordinate based on a time difference.

A case where preceding cutting and succeeding cutting are started from different Z-axis coordinates as shown in FIG. 12 will be described. In this case, a point ((Ztmin, Tzmin) on the graph shown in FIG. 13) at which the time at which the cutting motion of the second path (succeeding cutting) passes a Z coordinate–the time at which the cutting motion of the first path (preceding cutting) passes the same Z coordinate is minimum is found in the range of Z coordinates over which the cutting motion of the first path (preceding cutting) is moved, on the assumption that the first path (preceding cutting) and the second path (succeeding cutting) are started at the same time as shown in FIG. 13, and the start timing of the second path (succeeding cutting) is determined with reference to the point.

A case where the Z-axis coordinates of preceding cutting and succeeding cutting do not overlap each other as shown in FIG. 14 will be described. In this case, since the tool routes of the first path (preceding cutting) and the second path (succeeding cutting) do not overlap each other as shown on the graph in FIG. 14, the second path (succeeding cutting) does not meet the first path (preceding cutting) even if the first path and the second path are started at the same time. Accordingly, the second path (succeeding cutting) may start cutting at any time (that is, the order of machining may be reversed).

Figure 15:
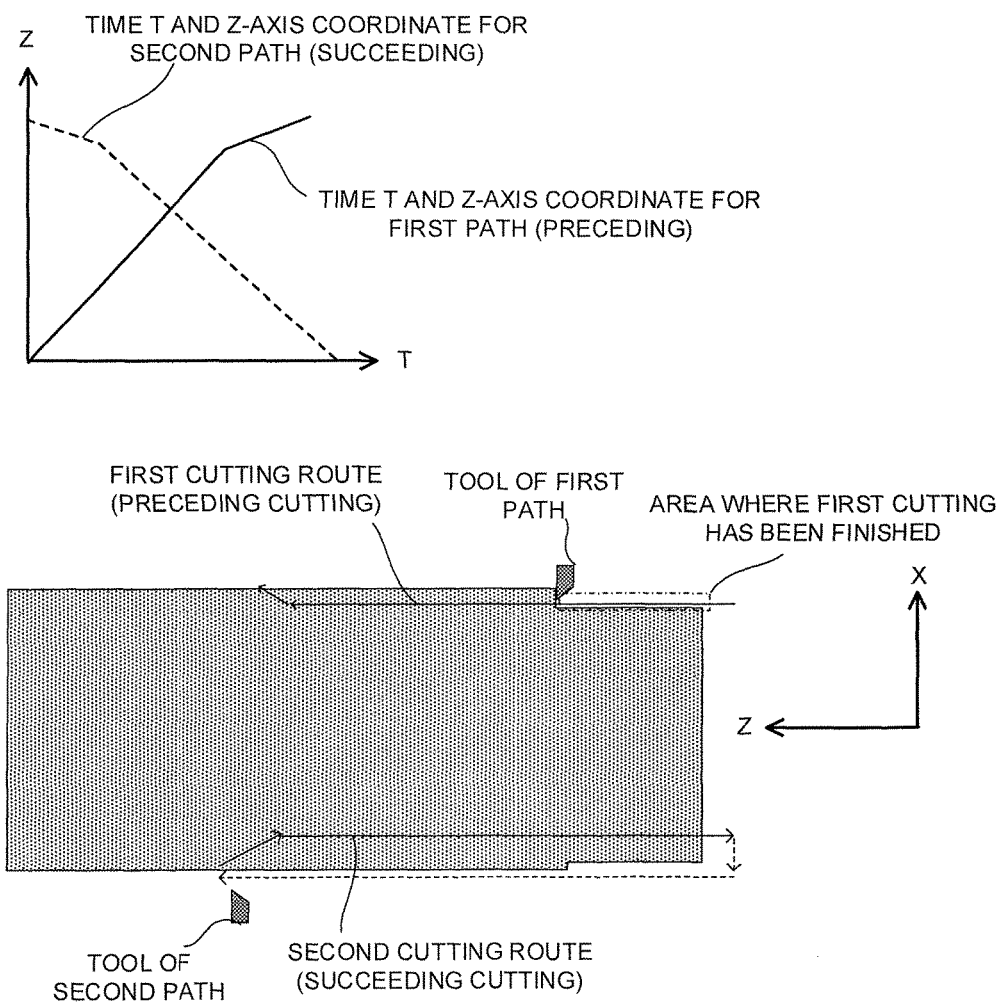
FIG. 15 is a view showing the relationship between time T and Z-axis coordinate for preceding cutting and succeeding cutting having different cutting directions with a graph.

In the case where the Z-axis coordinates of preceding cutting and succeeding cutting overlap each other and where the succeeding cutting moves in a direction opposite to that of the preceding cutting with respect to the Z axis as shown in FIG. 15, the cutting motion of the second path (succeeding cutting) may be started after the first path (preceding cutting) is finished as shown in FIG. 16.

In the case where preceding cutting which is being performed by the first path is not finished even after succeeding cutting is finished as shown in FIG. 17, the next cutting is assigned to the second path, which finishes cutting first. At that time, the start timing of the next cutting is determined as in the above-described case.

Figure 18:
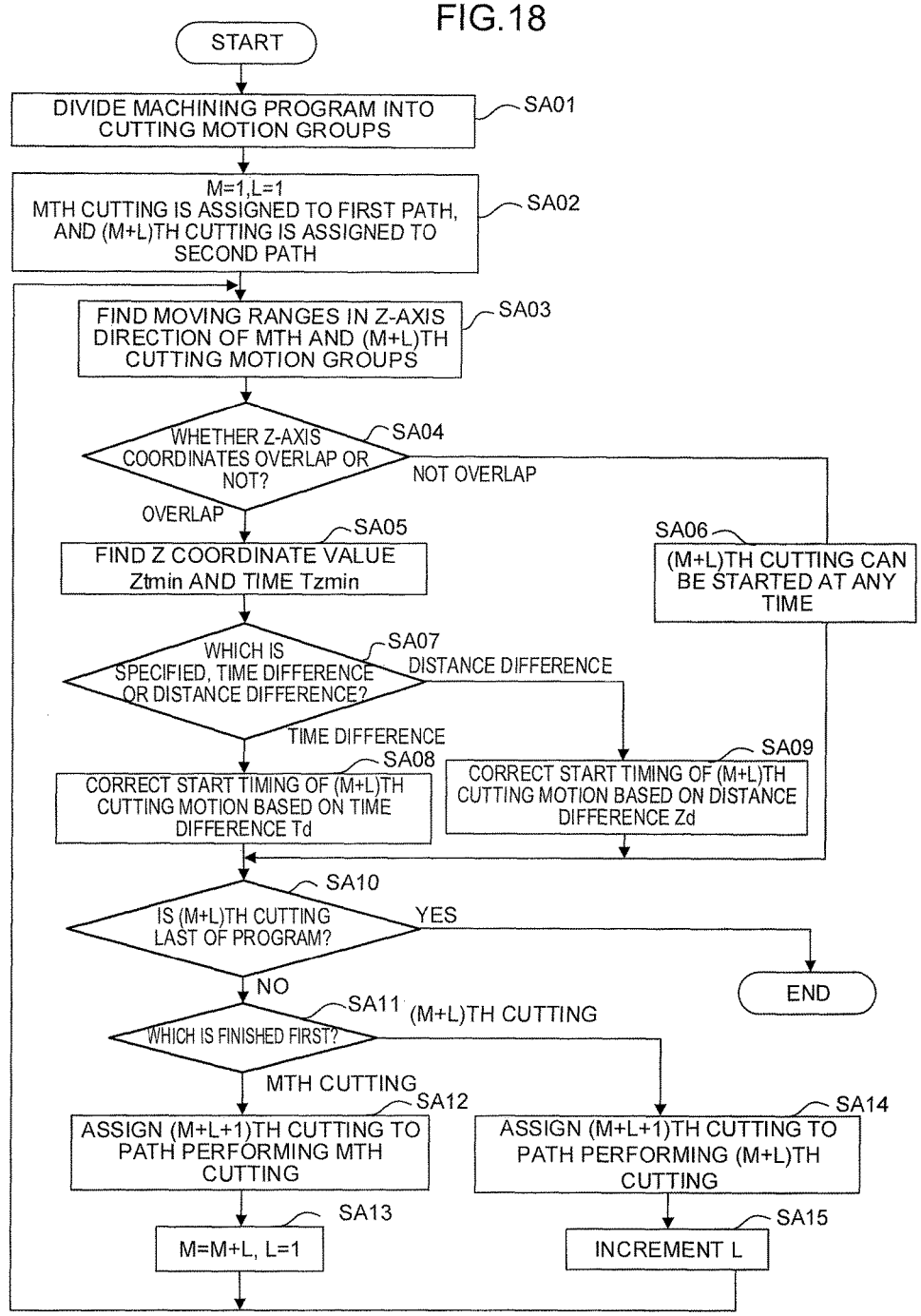
FIG. 18 a flowchart showing the overview of an example of a process for assigning cutting motion groups which is executed in the numerical controller of the present invention to paths.

FIG. 18 is a flowchart showing the overview of a process for dividing a machining program for a single path which is executed on the numerical controller of the present embodiment into portions assigned to two paths.

[Step SA01] A machining program for a single path is divided into groups of cutting motions by using rapid motions as delimiters, and the groups are numbered. For example, in the case of a machining program as described below, N01 G00 X90
N02 G01 Z100
N03 G01 X110 Z110
N04 G00 Z0
N05 G00 X80
N06 G01 Z110
N07 G01 X110 Z120
N08 G00 Z0
. . .

the delimiters are N01, N04, N05, and N08, and cutting motion groups separated by the delimiters are a cutting motion group of N02 and N03 and a cutting motion group of N06 and N07. The cutting motion groups thus obtained by separating the whole program by rapid motions are numbered. In the case of the above-described example, the cutting motion group of N02 and N03 is numbered 1, and the cutting motion group of N06 and N07 is numbered 2. Similarly, cutting motion groups of the whole program are numbered, and the results are stored in memory.

[Step SA02] In initial assignment for two-path control, the first cutting motion group is assigned to the first path, and the second cutting motion group is assigned to the second path. The path to which each group is assigned is stored in memory with the group number. In this example, a second or later group is indicated by the number M+L using variables M and L. The initial value of M is 1, and the initial value of L is 1. Hereinafter, cutting motions included in one group are collectively referred to as Mth cutting or (M+L)th cutting.

[Step SA03] The moving range in the Z-axis direction of Mth cutting and the moving range in the Z-axis direction of (M+L)th cutting are found.

[Step SA04] If the ranges of Z coordinates of the Mth cutting and the (M+L)th cutting overlap each other, the flow goes to step SA05; otherwise, the flow goes to step SA06.

[Step SA05] If the ranges of Z coordinates of the Mth cutting and the (M+L)th cutting overlap each other, the time at which the (M+L)th cutting passes each of the overlapping Z-axis coordinates–the time at which the Mth machining passes the same coordinate is calculated, and the Z coordinate Ztmin at which the result of the calculation is minimum is found. Moreover, the time Tzmin at which the path to which the Mth cutting is assigned passes Ztmin is found. It should be noted that in the case where there are two or more times at which the Mth cutting passes Ztmin (time elapses without moving in the Z-axis direction), the latest time is used as Tzmin. Further, in the case where there are two or more minimum Z coordinates Ztmin, the Z coordinate at the latest time is used as Ztmin.

[Step SA06] If the ranges of Z coordinates of the Mth cutting and the (M+L)th cutting do not overlap each other, the (M+L)th cutting can be started at any time. The start timing of the (M+L)th cutting is set to 0 seconds behind the start of the Mth cutting (machining is started at the same time).

[Step SA07] The time lag between the Mth cutting and the (M+L)th cutting is set based on the specified value Td for the minimum time difference between the time at which the Mth cutting passes a Z coordinate and the time at which the (M+L)th cutting passes the same Z coordinate or the specified value Zd for the minimum distance difference in the Z-axis direction at which the Mth cutting and the (M+L)th cutting come closest to each other. These specified values are set in memory in advance. If it is specified that the specified value Td for the minimum time difference is used, the flow goes to step SA08. If it is specified that the minimum value Zd for distance is used, the flow goes to step SA09.

[Step SA08] If it is specified that the specified value Td for the minimum time difference is used, the start timing of the (M+L)th cutting is set to a time lagged behind the start of the Mth cutting by {the specified value+(the time at which the Mth cutting passes Ztmin–the time at which the (M+L)th cutting passes Ztmin)}. In the case where there are two or more times at which the Mth cutting passes Ztmin (time elapses without moving in the Z-axis direction), the latest time is used. In the case where there are two or more times at which the (M+L)th cutting passes Ztmin (time elapses without moving in the Z-axis direction), the earliest time is used. In the case where the start timing of the (M+L)th cutting is determined based on the position of the Mth cutting, the timing at which the Mth cutting passes Ztmin is used. The start timing of the (M+L)th cutting is stored in memory with the group number.

[Step SA09] In the case where it is specified that the specified value Zd for the minimum distance difference is used, the start timing of the (M+L)th cutting is the time lagged behind the start of the Mth cutting by {Tzmin–(the time at which the (M+L)th cutting passes (Ztmin–the specified value))}. In the case where the start timing of the (M+L)th cutting is determined based on the position of the Mth cutting, the timing at which the Mth cutting passes Ztmin is used. The start timing of the (M+L)th cutting is stored in memory with the group number.

[Step SA10] If the (M+L)th cutting does not belong to the last cutting motion group of the program, the flow goes to step SA11. If the (M+L)th cutting belongs to the last cutting motion group of the program, this processing is ended.

[Step SA11] If the (M+L)th cutting does not belong to the last cutting motion group of the program, which of the Mth cutting and the (M+L)th cutting is finished first is checked based on the start timing of the (M+L)th cutting, the machining time of the (M+L)th cutting, and the machining time of the Mth cutting. If the Mth cutting is finished first, the flow goes to step SA12. If the (M+L)th cutting is finished first, the flow goes to step SA14.

[Step SA12] If the Mth cutting is finished first, the (M+L+1)th cutting is assigned to the path which has performed the Mth cutting. Specifically, the Mth cutting which has been started first is finished first, and cutting next to the (M+L)th cutting is assigned to the path which has performed the Mth cutting. The path to which the (M+L+1)th cutting is assigned is stored in memory with the group number of the cutting motion group.

[Step SA13] The group number M+L of a cutting motion group which is currently being executed (or the last cutting motion group which has been machined) is assigned to the variable M, then L is reset to 1, and the flow goes to step SA03.

[Step SA14] If the (M+L)th cutting is finished first, the (M+L+1)th cutting is assigned to the path which has performed the (M+L)th cutting. Specifically, the (M+L)th cutting which has been started later is finished first, and cutting next to the (M+L)th cutting is assigned to the path which has performed the (M+L)th cutting. The path to which the (M+L+1)th cutting is assigned is stored in memory with the cutting motion group number.

[Step SA15] L is incremented (increased by 1), and the flow goes to step SA03.

Machining is performed by controlling the paths based on the program divided into portions assigned to the paths by the above-described assignment process and cutting start timing which are stored in memory. Succeeding machining can start the cutting at any time after the found cutting start timing.

Figure 19:
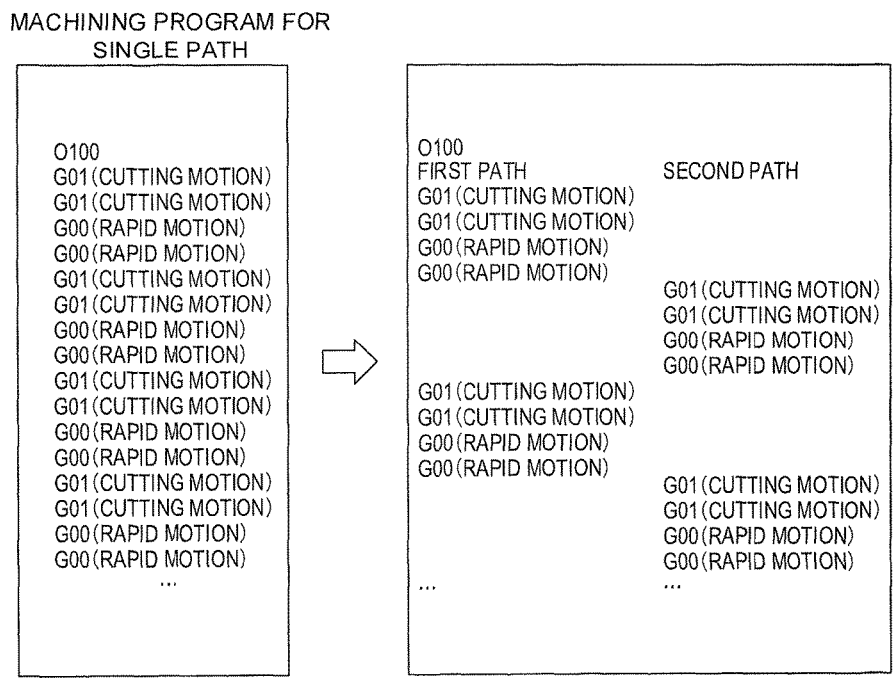
FIG. 19 shows an example of a display of a machining program after assignment is performed according to the present invention.

The machining program divided into portions assigned to the paths by the above-described assignment process can be displayed such that, for example, the portions are separated into areas for the respective paths, as shown in FIG. 19. At this time, whether preceding cutting motion and succeeding cutting motion overlap each other, and whether preceding cutting motion and succeeding cutting motion can be performed independently or succeeding cutting motion waits until preceding cutting is finished can be indicated by using different colors, shifting paragraphs, inserting horizontal lines, or the like.

Figure 20:
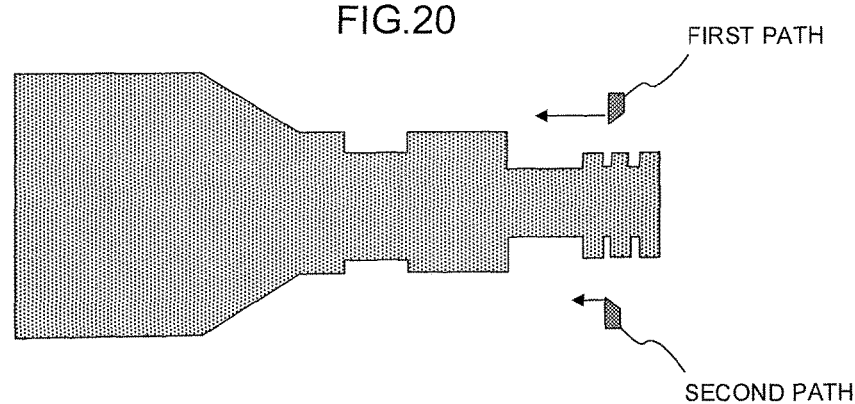
FIG. 20 shows an example of a display of a simulation of the operation of a machining program after assignment is performed according to the present invention.

As shown in FIG. 20, performing a machining simulation based on cutting motion groups assigned to the respective paths and start timings thereof makes it possible to check motions of the respective paths, the degree of overlapping, and the like.

An operator who looks at the machining program displayed as described above can replace the paths with each other and revise the program.

The flowchart in FIG. 18 is for a two-path system. In machining apparatuses of other number of paths such as three paths and four paths, performing similar checks among the paths to which cutting motion groups are assigned makes it possible to assign cutting motion groups contained in a machining program for a single path to the paths and find start timings.

The above-described assignment process may be performed while the machining program is being prefetched during turning. Instead, machining may be started after the machining program is simulated in advance before turning is started and all assignments to the paths are finished.

Figure 21:
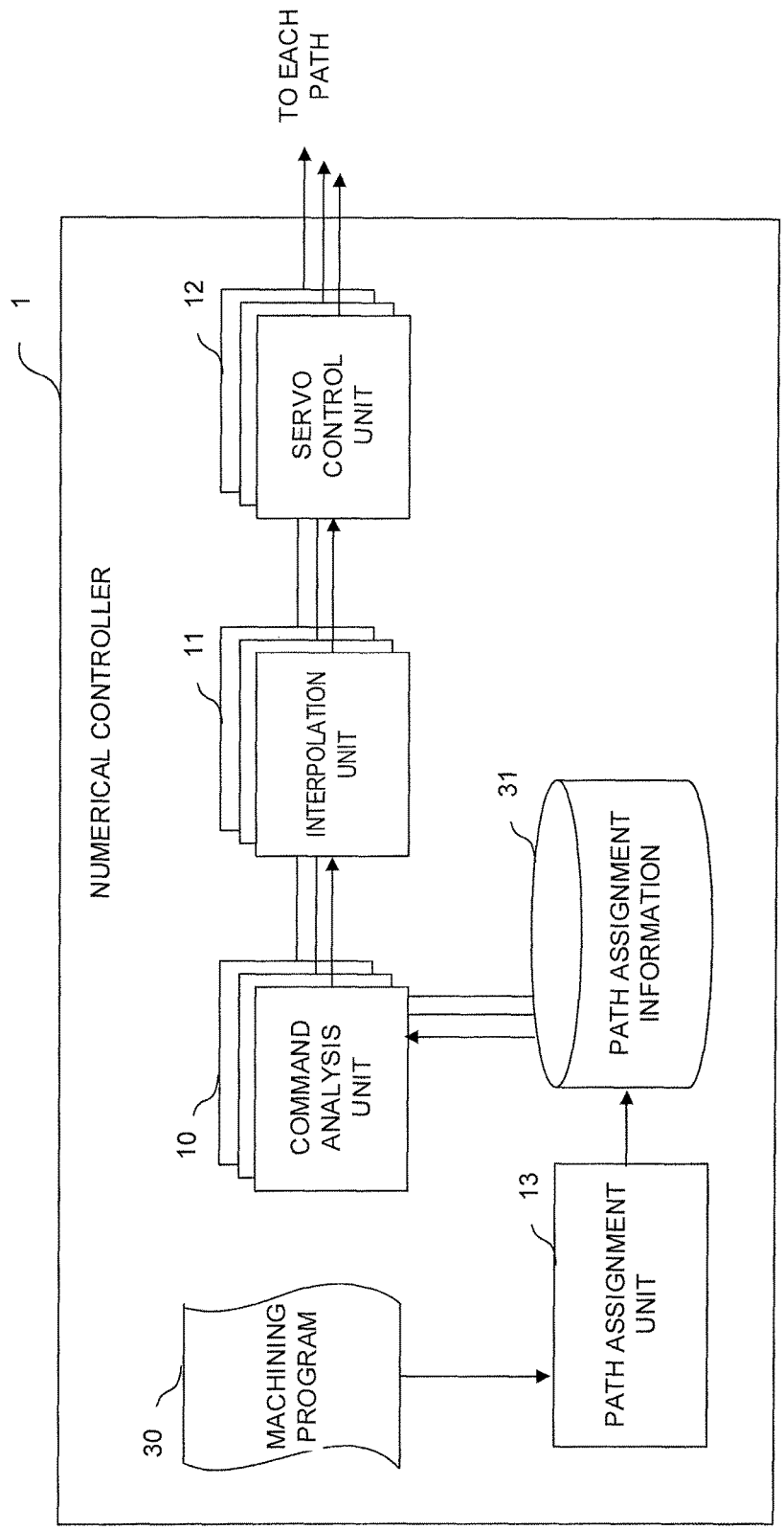
FIG. 21 is a functional block diagram of a numerical controller according to one embodiment of the present invention.

FIG. 21 is a functional block diagram of a numerical controller according to one embodiment of the present invention which is configured to execute the above-described assignment process while a machining program is being prefetched during turning. A numerical controller 1 of this embodiment includes a command analysis unit 10, an interpolation unit 11, a servo control unit 12 for each path to be controlled, and further includes a path assignment unit 13.

The path assignment unit 13 sequentially prefetches a machining program 30 for a single path stored in unillustrated memory, and executes the assignment process shown in the flowchart in FIG. 18 to assign cutting motion groups to the paths, determine the start timing of each cutting motion group, and store the assignments and the start timings in a path assignment information storing unit 31 provided on unillustrated memory as path assignment information.

The command analysis unit 10 of each path reads and analyzes commands specified in a cutting motion group assigned to the path from the path assignment information storing unit 31, creates command data which specifies the movement of the tool to be controlled for the path based on the result of the analysis, and outputs the created command data to the interpolation unit 11. The command data includes analyzed data concerning the start timing of the cutting motion group.

The interpolation unit 11 of each path generates interpolation data based on the command data received from the command analysis unit 10 as points for respective interpolation periods on a command route specified by the command data, and adjusts the speed of each axis (acceleration/deceleration process) with respect to the generated interpolation data for each interpolation period. Then, the interpolation unit 11 outputs the adjusted interpolation data for each interpolation period to the servo control unit 12 as a position command for specifying the position (travel amount) of the tool for each interpolation period. It should be noted that the start timing of the cutting motion group contained in the command data is reflected in the output timing of the interpolation data.

The servo control unit 12 of each path controls a servo motor for driving the tool to be controlled for the path based on the position command A received from the interpolation unit 11.

Figure 22:
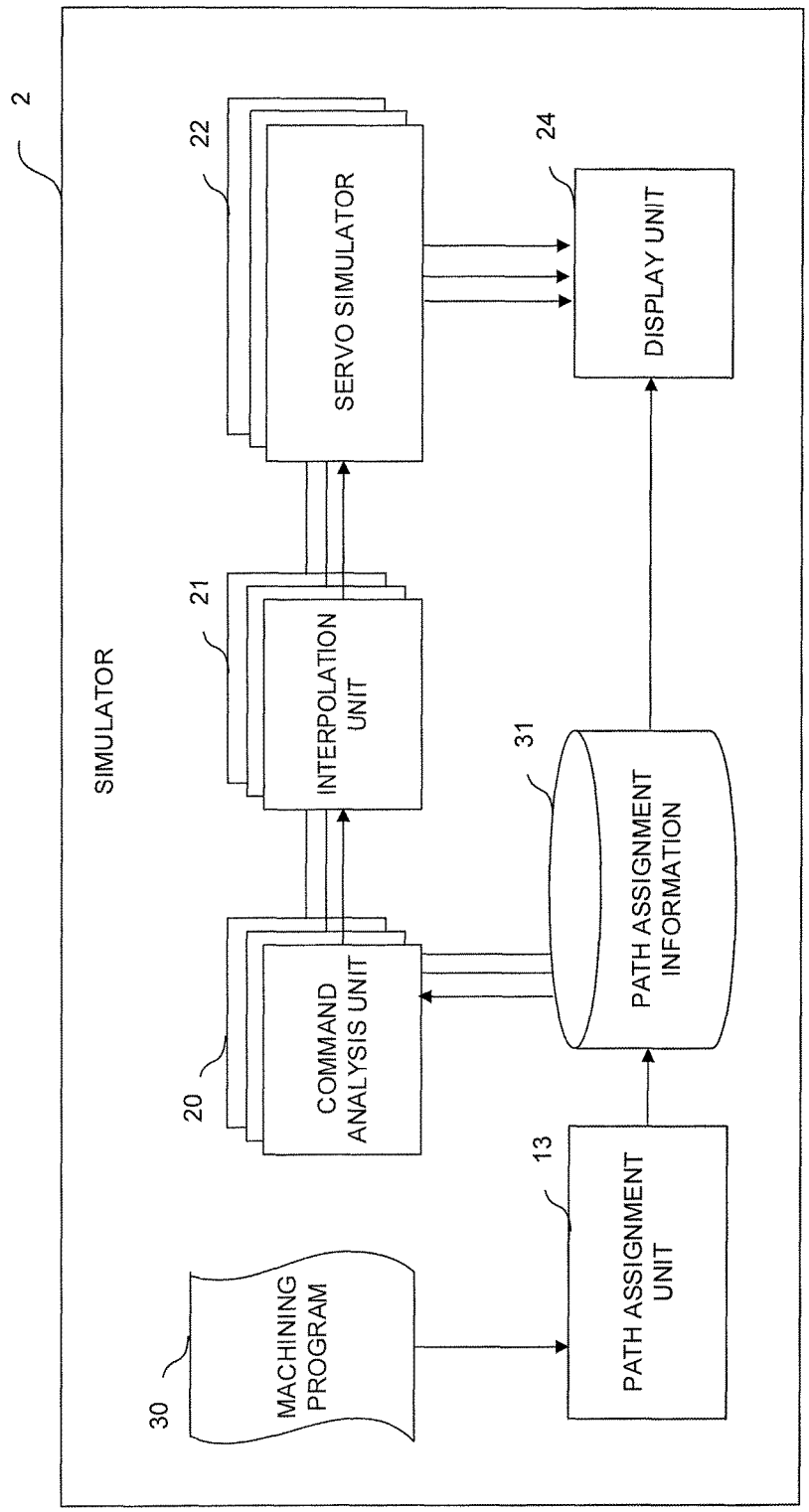
FIG. 22 is a functional block diagram of a simulator according to one embodiment of the present invention.
Figure 24:
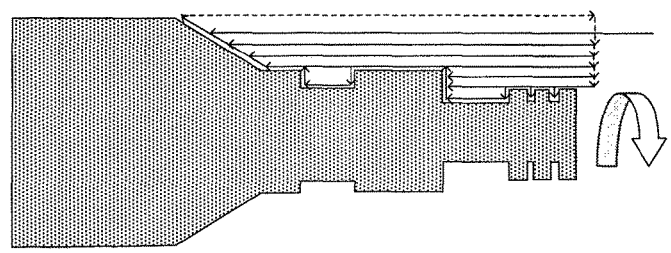
FIG. 24 is a view showing a cutting route of a tool in accordance with a single-path machining program.
Figure 25:
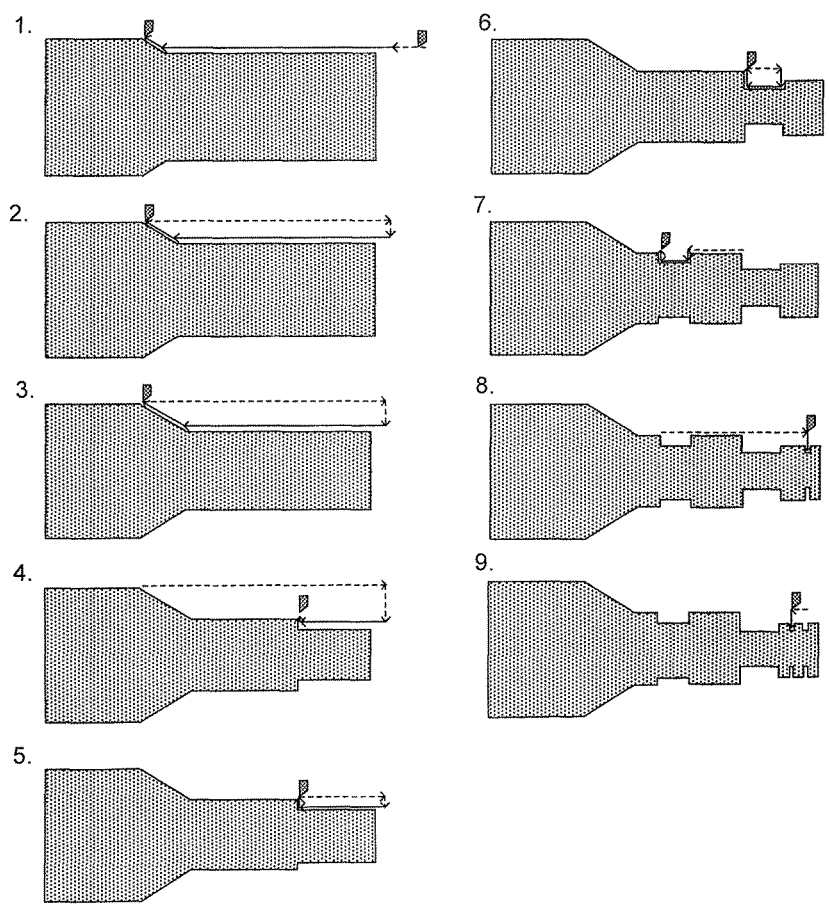
FIG. 25 is a view showing the cutting route of the tool in FIG. 24 step by step.

FIG. 22 is a functional block diagram of a simulator according to one embodiment of the present invention which simulates the above-described assignment process before turning is started and which performs all assignments to the paths. The simulator 2 of this embodiment includes a command analysis unit 20, an interpolation unit 21, and a servo simulator 22 for each path to be controlled, and further includes a display unit 24 and a path assignment unit 13.

The path assignment unit 13 sequentially prefetches a machining program 30 for a single path stored in unillustrated memory, and executes the assignment process shown in the flowchart in FIG. 18 to assign cutting motion groups to the paths, determine the start timing of each cutting motion group, and store the assignments and the start timings in a path assignment information storing unit 31 provided on unillustrated memory as path assignment information. The path assignment information stored in the path assignment information storing unit 31 is read out and set in the numerical controller. Thus, the numerical controller can control each path based on the set path assignment information.

The command analysis unit 20 of each path reads and analyzes commands specified in a cutting motion group assigned to the path from the path assignment information storing unit 31, creates command data which specifies the movement of the tool to be controlled for the path based on the result of the analysis, and outputs the created command data to the interpolation unit 21. The command data includes analyzed data concerning the start timing of the cutting motion group.

The interpolation unit 21 of each path generates interpolation data based on the command data received from the command analysis unit 20 as points for respective interpolation periods on a command route specified by the command data, and adjusts the speed of each axis (acceleration/deceleration process) with respect to the generated interpolation data for each interpolation period. Then, the interpolation unit 21 outputs the adjusted interpolation data for each interpolation period to the servo simulator 22 as a position command for specifying the position (travel amount) of the tool for each interpolation period. It should be noted that the start timing of the cutting motion group contained in the command data is reflected in the output timing of the interpolation data.

The servo simulator 22 of each path simulates the operation of a servo motor for driving the tool to be controlled for the path based on the position command A received from the interpolation unit 21. The simulation process is sufficiently publicly known from prior art documents such as Japanese Patent Application Laid-Open Nos. 2014-016982 and 2014-186371, and detailed explanation thereof is omitted in the present specification.

The display unit 24 displays, for example, a simulation of the operation of the tool of each path, the result of assignments of the program to the paths, and the like based on the path assignment information stored in the path assignment information storing unit 31, the result of the simulation process performed by the servo simulator 22, and the like.

While embodiments of the present invention have been described above, the present invention is not limited only to the above-described examples of embodiments, but can be carried out in various aspects by making appropriate modifications thereto.

The invention claimed is:

1. A numerical controller for controlling a machine having two or more paths based on a machining program for a single path in which a workpiece is attached to a main axis to be rotated and in which two or more tools are moved in a radial direction of the workpiece and a direction parallel to the axis of rotation to perform cutting, the numerical controller comprising:
    a processor configured to:
        divide the machining program into cutting motion groups by using rapid motions as delimiters,
        assign the cutting motion groups to two or more respective paths corresponding to the two or more tools,
        generate path assignment information in which the assigned cutting motion groups are overlapped between a cutting motion group located earlier on the machining program and a cutting motion group located later on the machining program such that a cutting position of the two or more tools assigned to the cutting motion group located later on the machining program does not overtake a cutting position of two or more tools assigned to the cutting motion group located earlier on the machining program, and
    control the two or more tools to move along the two or more respective paths to perform cutting of the workpiece based on the path assignment information.

2. The numerical controller according to claim 1, wherein the processor is further configured to overlap the cutting motion groups such that the cutting position by the cutting motion group located later does not overtake the cutting position by the cutting motion group located earlier by setting cutting start timing of the cutting motion group located later.

3. The numerical controller according to claim 2, wherein the processor is further configured to set the cutting start timing of the cutting motion group located later based on a preset value for a minimum time difference between cutting by the cutting motion group located earlier and cutting by the cutting motion group located later.

4. The numerical controller according to claim 2, wherein the processor is further configured to set the cutting start timing of the cutting motion group located later based on a preset value for a minimum distance difference between cutting by the cutting motion group located earlier and cutting by the cutting motion group located later.

5. The numerical controller according to claim 1, wherein if it is determined that coordinates of the cutting position by the cutting motion group located earlier and the cutting position by the cutting motion group located later do not overlap each other with respect to a direction of an axis of rotation of the main axis, the processor is further configured to set the path assignment information such that cutting by the cutting motion group located later is started regardless of the cutting position by the cutting motion group located earlier.

6. The numerical controller according to claim 1, wherein if cutting by the cutting motion group located later is finished earlier than cutting by the cutting motion group located earlier, the processor is further configured to assign a next cutting motion group to the path finishing cutting earlier.

7. A simulator for simulating operation of a machine having two or more paths based on a machining program for a single path in which a workpiece is attached to a main axis to be rotated and in which two or more tools are moved in a radial direction of the workpiece and a direction parallel to the axis of rotation to perform cutting, the simulator comprising:
    a processor configured to:
        divide the machining program into cutting motion groups by using rapid motions as delimiters,
        assign the cutting motion groups to two or more respective paths, and
        generate path assignment information in which the assigned cutting motion groups are overlapped between a cutting motion group located earlier on the machining program and a cutting motion group located later on the machining program such that a cutting position of the two or more tools assigned to the cutting motion group located later on the machining program does not overtake a cutting position of two or more tools assigned to the cutting motion group located earlier on the machining program, and simulate movement of the two or more tools along the two or more respective paths to simulate cutting of the workpiece based on the path assignment information.

8. The simulator according to claim 7, wherein the processor is further configured to overlap the cutting motion groups such that the cutting position by the cutting motion group located later does not overtake the cutting position by the cutting motion group located earlier by setting cutting start timing of the cutting motion group located later.

9. The simulator according to claim 8, wherein the processor is further configured to set the cutting start timing of the cutting motion group located later based on a preset value for a minimum time difference between cutting by the cutting motion group located earlier and cutting by the cutting motion group located later.

10. The simulator according to claim 8, wherein the processor is further configured to set the cutting start timing of the cutting motion group located later based on a preset value for a minimum distance difference between cutting by the cutting motion group located earlier and cutting by the cutting motion group located later.

11. The simulator according to claim 7, wherein if it is determined that coordinates of the cutting position by the cutting motion group located earlier and the cutting position by the cutting motion group located later do not overlap each other with respect to a direction of an axis of rotation of the main axis, the processor is further configured to set the path assignment information such that cutting by the cutting motion group located later is started regardless of the cutting position by the cutting motion group located earlier.

12. The simulator according to claim 7, wherein if cutting by the cutting motion group located later is finished earlier than cutting by the cutting motion group located earlier, the processor is further configured to assign a next cutting motion group to the path finishing cutting earlier.

* * * * *